US012535751B2

United States Patent
Tsuda et al.

(10) Patent No.: US 12,535,751 B2
(45) Date of Patent: Jan. 27, 2026

(54) TONER PARTICLE HAVING HYDROTALCITE PARTICLE CONTAINING FLUORINE

(71) Applicant: CANON KABUSHIKI KAISHA, Tokyo (JP)

(72) Inventors: Shohei Tsuda, Shizuoka (JP); Kenta Kamikura, Kanagawa (JP); Kosuke Fukudome, Tokyo (JP); Yuta Komiya, Kanagawa (JP); Satoshi Arimura, Shizuoka (JP); Toru Ishii, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 401 days.

(21) Appl. No.: 18/173,278

(22) Filed: Feb. 23, 2023

(65) Prior Publication Data

US 2023/0314974 A1 Oct. 5, 2023

(30) Foreign Application Priority Data

Feb. 28, 2022 (JP) ................................ 2022-029175

(51) Int. Cl.
*G03G 9/097* (2006.01)
*G03G 9/08* (2006.01)

(52) U.S. Cl.
CPC ....... *G03G 9/09708* (2013.01); *G03G 9/0819* (2013.01)

(58) Field of Classification Search
CPC ......................... G03G 9/09708; G03G 9/0819
See application file for complete search history.

(56) References Cited

U.S. PATENT DOCUMENTS 7,123,862 B2 10/2006 Hasegawa
7,141,342 B2 11/2006 Toyoda
(Continued)

FOREIGN PATENT DOCUMENTS

CN 100507727 C 7/2009
EP 3 709 087 A1 9/2020
(Continued)

OTHER PUBLICATIONS

English machine translation of the description of JP-2000035692-A (Year: 2000).*
(Continued)

*Primary Examiner* — Mark F. Huff
*Assistant Examiner* — Boone Alexander Evans
(74) *Attorney, Agent, or Firm* — VENABLE LLP

(57) ABSTRACT

A toner comprising a toner particle comprising a binder resin, and a strontium titanate particle and a hydrotalcite particle on a surface of the toner particle, wherein the hydrotalcite particle comprises fluorine, the fluorine is present inside the hydrotalcite particle in line analysis of STEM-EDS mapping analysis of the toner, and when an area ratio of the strontium titanate particle to the toner particle in an EDS measurement field, which is measured through the STEM-EDS mapping analysis of the toner, is defined as T1 (%) and an area ratio of the hydrotalcite particle to the toner particle in the EDS measurement field, which is measured through the STEM-EDS mapping analysis of the toner, is defined as H1 (%), T1/H1 is 0.15 to 9.00.

8 Claims, 1 Drawing Sheet

(56) References Cited

U.S. PATENT DOCUMENTS

| | | | |
|---|---|---|---|
| 7,264,910 | B2 | 9/2007 | Toyoda |
| 7,537,875 | B2 | 5/2009 | Mikuriya et al. |
| 7,582,401 | B2 | 9/2009 | Ogawa |
| 7,611,812 | B2 | 11/2009 | Michel et al. |
| 7,678,523 | B2 | 3/2010 | Hiroko |
| 7,678,524 | B2 | 3/2010 | Hasegawa |
| 7,833,685 | B2 | 11/2010 | Tanaka |
| 7,833,687 | B2 | 11/2010 | Kato |
| 7,923,190 | B2 | 4/2011 | Magome |
| 7,935,467 | B2 | 5/2011 | Dojo |
| 8,211,606 | B2 | 7/2012 | Murai |
| 8,227,162 | B2 | 7/2012 | Sano |
| 8,377,616 | B2 | 2/2013 | Tani |
| 8,426,091 | B2 | 4/2013 | Magome |
| 8,426,094 | B2 | 4/2013 | Magome |
| 8,518,620 | B2 | 8/2013 | Dojo |
| 8,614,044 | B2 | 12/2013 | Matsui |
| 8,628,899 | B2 | 1/2014 | Kawamura |
| 8,652,722 | B2 | 2/2014 | Yoshida et al. |
| 8,697,327 | B2 | 4/2014 | Shibata |
| 8,778,585 | B2 | 7/2014 | Matsui |
| 8,815,484 | B2 | 8/2014 | Tanaka |
| 8,828,639 | B2 | 9/2014 | Kamikura |
| 8,841,054 | B2 | 9/2014 | Dojo |
| 8,916,319 | B2 | 12/2014 | Ikeda |
| 8,940,467 | B2 | 1/2015 | Hashimoto |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,146,485 | B2 | 9/2015 | Tani |
| 9,152,065 | B2 | 10/2015 | Sano |
| 9,158,216 | B2 | 10/2015 | Shimano |
| 9,229,345 | B2 | 1/2016 | Ikeda |
| 9,235,151 | B2 | 1/2016 | Tanaka |
| 9,256,148 | B2 | 2/2016 | Fujikawa |
| 9,261,806 | B2 | 2/2016 | Moribe |
| 9,285,697 | B2 | 3/2016 | Fukudome |
| 9,377,705 | B2 | 6/2016 | Shimano |
| 9,377,708 | B2 | 6/2016 | Magome |
| 9,383,668 | B2 | 7/2016 | Noji |
| 9,423,714 | B2 | 8/2016 | Kenmoku |
| 9,470,993 | B2 | 10/2016 | Nishikawa |
| 9,500,972 | B2 | 11/2016 | Tanaka |
| 9,551,947 | B2 | 1/2017 | Hiroko |
| 9,556,290 | B2 | 1/2017 | Nishiura |
| 9,575,424 | B2 | 2/2017 | Nakagawa |
| 9,575,425 | B2 | 2/2017 | Naka |
| 9,588,450 | B2 | 3/2017 | Tsuda |
| 9,594,323 | B2 | 3/2017 | Fujikawa |
| 9,599,919 | B2 | 3/2017 | Isono |
| 9,606,462 | B2 | 3/2017 | Nomura |
| 9,632,441 | B2 | 4/2017 | Abe |
| 9,658,546 | B2 | 5/2017 | Tanaka |
| 9,658,549 | B2 | 5/2017 | Tanaka |
| 9,715,187 | B2 | 7/2017 | Mukumoto |
| 9,715,188 | B2 | 7/2017 | Terauchi |
| 9,720,340 | B2 | 8/2017 | Tominaga |
| 9,772,570 | B2 | 9/2017 | Tsuda |
| 9,778,583 | B2 | 10/2017 | Terauchi |
| 9,785,068 | B2 | 10/2017 | Umeda |
| 9,785,071 | B2 | 10/2017 | Shimano |
| 9,804,514 | B2 | 10/2017 | Suzumura |
| 9,804,519 | B2 | 10/2017 | Suzumura |
| 9,829,814 | B2 | 11/2017 | Yoshida |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,857,711 | B2 | 1/2018 | Yoshida |
| 9,880,478 | B2 | 1/2018 | Shimano |
| 9,904,193 | B2 | 2/2018 | Nakagawa |
| 9,904,195 | B2 | 2/2018 | Matsui |
| 9,927,728 | B2 | 3/2018 | Arimura |
| 9,946,179 | B2 | 4/2018 | Arimura |
| 9,946,181 | B2 | 4/2018 | Hasegawa |
| 9,952,523 | B2 | 4/2018 | Shimano |
| 9,958,801 | B2 | 5/2018 | Tanaka |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,263 | B2 | 5/2018 | Fukudome |
| 9,971,264 | B2 | 5/2018 | Sano |
| 10,012,919 | B2 | 7/2018 | Matsui |
| 10,012,923 | B2 | 7/2018 | Sano |
| 10,054,866 | B2 | 8/2018 | Tanaka |
| 10,101,683 | B2 | 10/2018 | Nishikawa |
| 10,114,303 | B2 | 10/2018 | Katsura |
| 10,156,800 | B2 | 12/2018 | Tsuda |
| 10,197,934 | B2 | 2/2019 | Matsui |
| 10,228,627 | B2 | 3/2019 | Nagashima |
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,310,397 | B2 | 6/2019 | Sano |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |
| 10,635,011 | B2 | 4/2020 | Umeda |
| 10,698,327 | B2 | 6/2020 | Nagashima |
| 10,732,530 | B2 | 8/2020 | Matsui |
| 10,782,623 | B2 | 9/2020 | Yoshiba |
| 10,845,721 | B2 | 11/2020 | Tanaka |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,877,388 | B2 | 12/2020 | Aoki |
| 10,877,389 | B2 | 12/2020 | Kamikura |
| 10,895,815 | B2 | 1/2021 | Kamikura |
| 10,942,466 | B2 | 3/2021 | Tominaga |
| 10,976,678 | B2 | 4/2021 | Yamawaki |
| 10,976,679 | B2 | 4/2021 | Tanaka |
| 11,003,103 | B2 | 5/2021 | Kinumatsu |
| 11,003,104 | B2 | 5/2021 | Katsura |
| 11,003,105 | B2 | 5/2021 | Sato |
| 11,092,905 | B2 | 8/2021 | Fukudome |
| 11,099,493 | B2 | 8/2021 | Komiya |
| 11,112,708 | B2 | 9/2021 | Uratani |
| 11,112,710 | B2 | 9/2021 | Nakayama |
| 11,112,712 | B2 | 9/2021 | Matsunaga |
| 11,112,714 | B2 | 9/2021 | Amano |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,845 | B2 | 11/2021 | Shimoda |
| 11,181,846 | B2 | 11/2021 | Kinumatsu |
| 11,249,408 | B2 | 2/2022 | Tsuda |
| 11,249,412 | B2 | 2/2022 | Kawamura |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,448,980 | B2 | 9/2022 | Matsui |
| 11,531,282 | B2 | 12/2022 | Kamikura |
| 11,573,519 | B2 | 2/2023 | Fumita |
| 2009/0305159 | A1 | 12/2009 | Zhou et al. |
| 2015/0004540 | A1 | 1/2015 | Ozawa |
| 2015/0010652 | A1 | 1/2015 | Kurogi |

(56) References Cited

U.S. PATENT DOCUMENTS

| | | | | |
|---|---|---|---|---|
| 2018/0120721 | A1 | 5/2018 | Obara et al. | |
| 2019/0064686 | A1* | 2/2019 | Terauchi ............ | G03G 9/09716 |
| 2020/0285165 | A1 | 9/2020 | Chiba et al. | |
| 2020/0292956 | A1 | 9/2020 | Amano | |
| 2021/0003934 | A1 | 1/2021 | Fumita | |
| 2021/0132519 | A1 | 5/2021 | Hashimoto | |
| 2021/0223731 | A1 | 7/2021 | Suzuki | |
| 2021/0373450 | A1 | 12/2021 | Kawaguchi | |
| 2021/0397110 | A1 | 12/2021 | Katsura | |
| 2021/0405549 | A1 | 12/2021 | Ookubo | |
| 2022/0026822 | A1 | 1/2022 | Sato | |
| 2022/0026823 | A1 | 1/2022 | Sano | |
| 2022/0121132 | A1 | 4/2022 | Yoshida | |
| 2022/0121133 | A1 | 4/2022 | Yamawaki | |
| 2022/0128915 | A1 | 4/2022 | Toyoda | |
| 2022/0128916 | A1 | 4/2022 | Yoshida | |
| 2022/0128919 | A1 | 4/2022 | Kawamura | |
| 2022/0146952 | A1 | 5/2022 | Komiya | |
| 2022/0146955 | A1 | 5/2022 | Nozaki | |
| 2022/0171301 | A1 | 6/2022 | Suzumura | |
| 2022/0171302 | A1 | 6/2022 | Sato | |
| 2022/0171303 | A1 | 6/2022 | Hiramatsu | |
| 2022/0206402 | A1 | 6/2022 | Uratani | |
| 2022/0214629 | A1 | 7/2022 | Kenmoku | |
| 2022/0214630 | A1 | 7/2022 | Kamikura | |
| 2022/0291601 | A1 | 9/2022 | Katsura | |
| 2022/0326633 | A1 | 10/2022 | Aoki | |
| 2022/0365457 | A1 | 11/2022 | Unno | |
| 2022/0373916 | A1 | 11/2022 | Adachi | |
| 2022/0390870 | A1 | 12/2022 | Kyuushima | |
| 2022/0390871 | A1 | 12/2022 | Isono | |
| 2022/0397836 | A1 | 12/2022 | Toyoda | |
| 2022/0404730 | A1 | 12/2022 | Nagaoka | |
| 2023/0014130 | A1 | 1/2023 | Sano | |
| 2023/0015518 | A1 | 1/2023 | Nozaki | |
| 2023/0042289 | A1 | 2/2023 | Tanaka | |
| 2023/0047510 | A1 | 2/2023 | Tsuda | |
| 2023/0047560 | A1 | 2/2023 | Saeki | |
| 2023/0080900 | A1 | 3/2023 | Kamikura | |
| 2023/0117448 | A1 | 4/2023 | Fukudome | |
| 2023/0122974 | A1 | 4/2023 | Kagawa | |

FOREIGN PATENT DOCUMENTS

| | | | | |
|---|---|---|---|---|
| JP | 55-28750 | A | | 2/1980 |
| JP | 2000-35692 | A | | 2/2000 |
| JP | 2000035692 | A | * | 2/2000 |
| JP | 2002-221820 | A | | 8/2002 |
| JP | 2005-272323 | A | | 10/2005 |
| JP | 2006-500605 | A | | 1/2006 |
| JP | 2007-322953 | A | | 12/2007 |
| JP | 2009-42343 | A | | 2/2009 |
| JP | 2013-68901 | A | | 4/2013 |
| JP | 2014-209197 | A | | 11/2014 |
| JP | 2015-11077 | A | | 1/2015 |
| JP | 2017-10002 | A | | 1/2017 |
| JP | 2017-198929 | A | | 11/2017 |
| JP | 2019-45578 | A | | 3/2019 |
| JP | 2019-168632 | A | | 10/2019 |
| JP | 2020-109511 | A | | 7/2020 |
| JP | 2020-148928 | A | | 9/2020 |
| JP | 2021-9251 | A | | 1/2021 |
| WO | 2013/147284 | A1 | | 10/2013 |
| WO | 2018/181189 | A1 | | 10/2018 |

OTHER PUBLICATIONS

U.S. Appl. No. 18/046,585, filed Oct. 14, 2022, Yuta Komiya.
U.S. Appl. No. 18/173,247, filed Feb. 23, 2023, Kosuke Fukudome.
U.S. Appl. No. 18/173,255, filed Feb. 23, 2023, Takayuki Toyoda.
U.S. Appl. No. 18/173,501, filed Feb. 23, 2023, Taiji Katsura.
U.S. Appl. No. 18/173,512, filed Feb. 23, 2023, Masatake Tanaka.
Kyowa Chemical Industry DHT-4A technical data sheet (2025).

* cited by examiner

TONER PARTICLE HAVING HYDROTALCITE PARTICLE CONTAINING FLUORINE

BACKGROUND OF THE INVENTION

Field of the Invention

The present disclosure relates to a toner used in image forming methods such as electrophotography.

Description of the Related Art

In recent years, electrophotographic image forming apparatuses such as multi-function machines and printers have started to be applied to the printing market, and there is a growing demand for higher image quality, higher speeds, and longer service life.

In order to increase speeds, it is necessary to have an electrification amount of a toner quickly reach a high and stable state. On the other hand, in order to make the service life of the electrophotographic image forming apparatus longer, that is, in order for the same to acquire the durability by which high-quality images can be obtained stably even in long-term use, for example, it is necessary to curb the occurrence of replenishment fog caused by the replenishment of a new toner.

The replenishment fog is caused by a large difference between the electrification amount of the toner after long-term use, which remains in a developing device and of which the electrification amount has decreased as a result of using one developing device for a long time, and the electrification amount of a new toner that has been newly replenished. Therefore, it is necessary to reduce the difference between the electrification amount of the toner after long-term use and the electrification amount of the new toner.

Various attempts have been made to meet the above requirements.

Japanese Patent Application Laid-Open No. 2019-045578 discloses a toner containing, as an external additive, fine particles of titanate having a Group 2 element and fine particles of a hydrotalcite compound, wherein a number average particle diameter of each of the fine particles of the titanate and the fine particles of the hydrotalcite compound satisfies a specific value.

Japanese Patent Application Laid-Open No. 2020-148928 discloses a toner in which spherical silica particles and hydrotalcite particles are used in combination and the fixation rate of the particles on a toner particle surface is controlled.

SUMMARY OF THE INVENTION

However, as a result of studies by the inventors of the present application, it is recognized that the toners disclosed in Japanese Patent Application Laid-Open No. 2019-045578 and Japanese Patent Application Laid-Open No. 2020-148928 still have to be improved in order to be used in an electrophotographic image forming apparatus with higher speeds and longer service life. Specifically, in a case where the toners according to Japanese Patent Application Laid-Open No. 2019-045578 and Japanese Patent Application Laid-Open No. 2020-148928 are installed in an electrophotographic image forming apparatus with higher speeds and longer service life, it is recognized that the toners have a certain effect in improving an electrification rising property and electrification stability. However, in a low-temperature and low-humidity environment, the replenishment fog may occur and the solid followability may deteriorate.

The reason why the toners disclosed in Japanese Patent Application Laid-Open No. 2019-045578 and Japanese Patent Application Laid-Open No. 2020-148928 cannot sufficiently curb the occurrence of the replenishment fog is presumed to be as follows.

In the toner disclosed in Japanese Patent Application Laid-Open No. 2019-045578, hydrotalcite particle is used as a microcarrier, the hydrotalcite particle is used in combination with fine particles of titanate having a lower resistance than a resin component, which is a main component of a toner particle, and the fine particles are present in a specific state on the surface of the toner particle. As a result, charges can be efficiently diffused over the entire toner surface, and high electrification stability can be maintained for a long period of time. However, in a case where an electrophotographic image forming apparatus with longer service life, that is, in a case where this apparatus has a toner replenishing system, the hydrotalcite particles detached from the toner after the apparatus is used for a long term are accumulated and concentrated in a developing device. Since the concentrated hydrotalcite particles are generally strongly positive, when a new toner is replenished, the toner is electrostatically aggregated via the hydrotalcite particles, and an electrification distribution becomes broad. As a result, the electrification distribution becomes broader when the toner after long-term use and the new toner are mixed, and the occurrence of replenishment fog cannot be curbed in some cases.

Further, in the toner disclosed in Japanese Patent Application Laid-Open No. 2020-148928, a spherical silica particle and a hydrotalcite particle are used in combination, and the fixation rates of the fine particles to a toner particle are controlled, and thus the aggregation of the hydrotalcite particles is curbed. As a result, it is described that the toner has a high electrification rising property over long-term use. However, as in the toner disclosed in Japanese Patent Application Laid-Open No. 2019-045578, in a case where the apparatus has a system of replenishing a toner, a new toner is electrostatically aggregated via the concentrated hydrotalcite particles, and as a result, the occurrence of the replenishment fog may be insufficiently curbed.

Thus, the present disclosure provides a toner that achieves both quick electrification stabilization and curbing of an electrification difference between new and old toners at the time of toner replenishment at a high level in order to solve the above-described problems that occur in a case where a toner containing strontium titanate particles and hydrotalcite particles is used in an electrophotographic image forming apparatus with higher speeds and longer service life.

The inventors of the present invention have investigated a method of achieving both the above-mentioned quick electrification stabilization and the above-mentioned curbing of the electrification difference between the old and new toners at the time of toner replenishment even in the electrophotographic image forming apparatus with higher speeds and longer service life and have found that the above problems can be solved by the following toner.

That is, the present disclosure relates to a toner comprising

- a toner particle comprising a binder resin,
- a strontium titanate particle on a surface of the toner particle, and
- a hydrotalcite particle on a surface of the toner particle, wherein the hydrotalcite particle comprises fluorine, the fluorine is present inside the hydrotalcite particle in line analysis of STEM-EDS mapping analysis of the toner, and when an area ratio of the strontium titanate particle to the toner particle in an EDS measurement field, which is measured through the STEM-EDS mapping analysis of the toner, is defined as T1(%) and an area ratio of the hydrotalcite particle to the toner particle in the EDS measurement field, which is measured through the STEM-EDS mapping analysis of the toner, is defined as H1(%), T1/H1 is 0.15 to 9.00.

According to the present disclosure, it is possible to provide a toner that can achieve quick electrification stabilization and can curb an electrification difference between new and old toners at the time of toner replenishment even in an electrophotographic image forming apparatus with higher speeds and longer service life. Further features of the present invention will become apparent from the following description of exemplary embodiments with reference to the attached drawings.

DESCRIPTION OF THE EMBODIMENTS

Figure 1A:
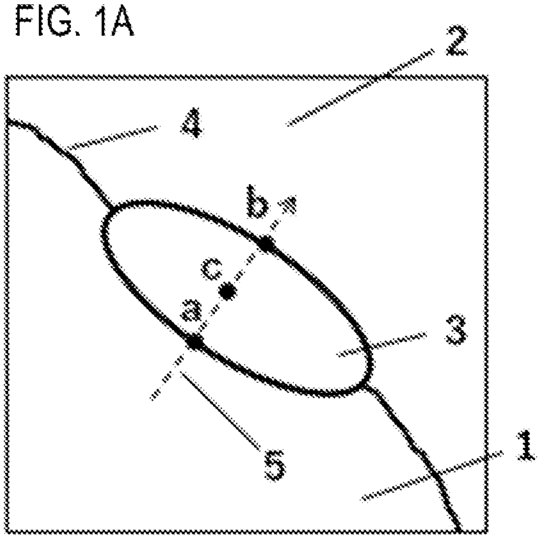
FIGS. 1A to 1C are schematic diagrams of EDS line analysis of STEM-EDS mapping analysis.

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

In the present disclosure, the term "(meth)acrylic" means "acrylic" and/or "methacrylic".

From the results of the above investigation, the inventors of the present invention thought to make the electrification distribution of the toner uniform, curb the occurrence of replenishment fog, and improve the solid followability by alleviating the electrostatic aggregation of the toner via the hydrotalcite particle accumulated and concentrated in the developing device after long-term use of the electrophotographic image forming apparatus.

The inventors of the present invention have repeated the investigation on the basis of this consideration and resultantly found that the toner according to the present disclosure satisfies the above requirements.

The present disclosure relates to a toner comprising a toner particle comprising a binder resin, a strontium titanate particle on a surface of the toner particle, and a hydrotalcite particle on a surface of the toner particle, wherein the hydrotalcite particle comprises fluorine, the fluorine is present inside the hydrotalcite particle in line analysis of STEM-EDS mapping analysis of the toner, and when an area ratio of the strontium titanate particle to the toner particle in an EDS measurement field, which is measured through the STEM-EDS mapping analysis of the toner, is defined as T1(%) and an area ratio of the hydrotalcite particle to the toner particle in the EDS measurement field, which is measured through the STEM-EDS mapping analysis of the toner, is defined as H1(%), T1/H1 is 0.15 to 9.00.

With such a toner, it is possible to achieve the quick electrification stabilization and to curb the electrification difference between the new and old toners at the time of toner replenishment even in the electrophotographic image forming apparatus with higher speeds and longer service life. The reason will be described below.

A toner of the present disclosure comprises a toner particle comprising a binder resin, a strontium titanate particle on a surface of the toner particle and a hydrotalcite particle on a surface of the toner particle. The hydrotalcite particle comprises fluorine. Further, the fluorine is present inside the hydrotalcite particle in line analysis of STEM-EDS mapping analysis of the toner. Furthermore, the hydrotalcite particle and the strontium titanate particle in an EDS measurement field, which are measured through the STEM-EDS mapping analysis of the toner, are present in a specific area ratio.

In the toner in which the hydrotalcite particle and the strontium titanate particle are present in a specific area ratio, since fluorine having a strong negative property is present inside the hydrotalcite particle, the hydrotalcite particle can have a negative property locally inside the particles. As a result, the strontium titanate particle having the same polarity, starting from the fluorine, form a complex with the hydrotalcite particle to be accumulated in the developing device. The complex particle make the replenished toner negative. Further, a positive component of hydrotalcite escapes to strontium titanate via moisture in air present around the fluorine inside the hydrotalcite particle. As a result, the strontium titanate particle has the positive components, and electrostatic repulsion occurs between the strontium titanate particles of different toners. Therefore, it is considered that the electrification distribution can be made remarkably sharp without electrostatically aggregating the toner.

As a result, even in a case where a device with higher process speeds and longer service life is used and the device has a toner replenishing system, it is possible to achieve both quick electrification stability of the toner and curbing of the occurrence of the replenishment fog due to curbing of an electrification difference between new and old toners at a high level. This is an effect that is first realized by using a specific hydrotalcite particle and a strontium titanate particle in combination and by setting the area ratio of each of the hydrotalcite particle and the strontium titanate particle on the surface of the toner particle within the above range.

In the present disclosure, when an area ratio of the strontium titanate particle to the toner particle in an EDS measurement field, which is measured through the STEM-EDS mapping analysis of the toner, is defined as T1(%) and an area ratio of the hydrotalcite particle to the toner particle in the EDS measurement field, which is measured through the STEM-EDS mapping analysis of the toner, is defined as H1(%), T1/H1 is 0.15 to 9.00. Further, T1/H1 is preferably 0.20 to 7.50.

In a case where T1/H1 is less than 0.15, it means that the strontium titanate particle is very few compared to the hydrotalcite particle. As a result, the positive components of the hydrotalcite particle cannot efficiently escape to the strontium titanate particle, and the electrostatic aggregation cannot be curbed. As a result, the electrification distribution becomes broad, the replenishment fog occurs, and the solid followability deteriorates.

On the other hand, in a case where T1/H1 exceeds 9.00, the strontium titanate particle is much more than the hydrotalcite particle, and the strontium titanate particle concentrated in the developing device are more than the hydrotalcite particle. As a result, the microcarrier effect due to the hydrotalcite particle does not function sufficiently. As a result, after long-term use, an electrification property of the toner is greatly reduced, the replenishment fog occurs, and the solid followability deteriorates.

T1/H1 can be controlled with the particle diameter of each of the hydrotalcite particle and the strontium titanate particle and the amount added to the toner particle. Further, T1/H1 can be calculated through the STEM-EDS mapping analysis of the toner, as in a measurement method which will be described later.

The toner of the present disclosure comprises the strontium titanate particle and the hydrotalcite particle.

The hydrotalcite particle used in the present disclosure will be described below.

The hydrotalcite particle comprises fluorine. Here, the presence or absence of fluorine content in the hydrotalcite particle can be verified through the STEM-EDS mapping analysis of the toner.

Further, in the hydrotalcite particle, the fluorine is present inside the hydrotalcite particle in the line analysis of the STEM-EDS mapping analysis of the toner.

Specifically, this means that the EDS line analysis is performed in a direction normal to the outer periphery of the hydrotalcite particle containing the fluorine, and the fluorine present inside the particle is detected.

The detection of the fluorine inside the hydrotalcite particle through the above analysis indicates that the fluorine is intercalated between layers of the hydrotalcite particle. When the fluorine is present inside the hydrotalcite particle, the electrification rising property is improved, the solid followability is improved, and the occurrence of the replenishment fog is easily curbed, as described above. The introduction of fluorine into the inside of the hydrotalcite particle is preferably performed by introducing (intercalating) fluoride ions between layers by anion exchange.

The atomic concentration of the fluorine in the hydrotalcite particle is not particularly limited, but it is preferably 0.05 atm % to 3.50 atm %, more preferably 0.10 atm % to 3.20 atm %, and further preferably 0.20 atm % to 1.60 atm %. Within this range, it is easy to have a local negative property, it is easy to form a complex with the strontium titanate, and it is easier to prevent the electrostatic aggregation of the toner.

The atomic concentration of the fluorine in the hydrotalcite particle can be controlled by adjusting the concentration of the fluorine during production of the hydrotalcite. For example, it can be controlled by adjusting the amount of sodium fluoride added. Further, the atomic concentration of the fluorine in the hydrotalcite particle can be obtained from main component mapping of the hydrotalcite particle through the STEM-EDS mapping analysis of the toner.

A value of a ratio F/Al (an elemental ratio) in an atomic concentration of the fluorine to the aluminum in the hydrotalcite particle, which is obtained from the main component mapping of the hydrotalcite particle through the STEM-EDS mapping analysis of the toner, is preferably 0.01 to 0.70, more preferably 0.02 to 0.60, further preferably 0.04 to 0.30.

When F/Al is 0.01 or more, the presence of the fluorine inside the hydrotalcite particle enhances the releasability between the hydrotalcite particle. As a result, the dispersibility of the hydrotalcite particle in the developing device is improved, and the function as the microcarrier tends to work more effectively. As a result, the electrification rising property after continuous output of a solid image is further improved, and the so-called solid followability is further improved. Further, since the electrification distribution of the toner becomes sharp, it is easy to curb the occurrence of the replenishment fog.

Further, when F/Al is 0.70 or less, the hydrotalcite particle can be sufficiently utilized as the microcarriers due to the positive property of the hydrotalcite particle. As a result, the electrification rising property after continuous output of a solid image is further improved, and the solid followability is further improved. Further, since the electrification distribution of the toner becomes sharp, it is easy to curb the occurrence of the replenishment fog.

F/Al can be controlled by adjusting the concentration of the fluorine during production of the hydrotalcite.

The hydrotalcite particle may be one represented by the following structural formula (1):

$$M^{2+}{}_{y}M^{3+}{}_{x}(OH)_2A^{n-}{}_{(x/n)}\cdot mH_2O \quad (1)$$

in which $M^{2+}$ and $M^{3+}$ represent bivalent and trivalent metals, respectively.

The hydrotalcite particle may be a solid solution containing multiple different elements. It may also contain a trace amount of a monovalent metal.

However, preferably $0<x\leq 0.5$, $y=1-x$, and $m\geq 0$.

$M^{2+}$ is preferably at least one bivalent metal ion selected from the group consisting of Mg, Zn, Ca, Ba, Ni, Sr, Cu and Fe.

$M^{3+}$ is preferably at least one trivalent metal ion selected from the group consisting of Al, B, Ga, Fe, Co and In.

$A^{n-}$ is an anion having a valency of n, and includes at least $F^-$, and $CO_3^{2-}$, $OH^-$, $Cl^-$, $I^-$, $Br^-$, $SO_4^{2-}$, $HCO_3^-$, $CH_3COO^-$, $NO_3^-$; and the like, may also be present, or a plurality of different anions may be present.

The divalent metal ion $M^{2+}$ is preferably magnesium, and the trivalent metal ion $M^{3+}$ is preferably aluminum. Further, the hydrotalcite particle of the present disclosure preferably comprises aluminum and magnesium.

Examples of a specific compositional formula include $Mg_{8.6}Al_4(OH)_{25.2}F_2CO_3\cdot mH_2O$, $Mg_{12}Al_4(OH)_{32}F_2CO_3\cdot mH_2O$, and the like.

Moreover, the hydrotalcite particle preferably has water in their molecules. Specifically, in Compositional Formula (1), it is more preferable that $0.1<m<0.6$. As a result, after the toner is made to be negative, the positive charges of the hydrotalcite particle can efficiently flow to the strontium titanate particle.

The number average particle diameter H3 (nm) of primary particle of the hydrotalcite particle is preferably from 40 nm to 1100 nm, more preferably 50 nm to 1000 nm, further preferably 60 nm to 900 nm, and particularly preferably 400 nm to 800 nm.

By controlling the above particle diameter within the above range, it is easy to achieve both toner fluidity and a microcarrier effect, occurrence of the replenishment fog is further curbed, and the electrification distribution is sharpened to further improve halftone reproducibility.

The above particle diameter can be measured using a known means such as a scanning electron microscope. In addition, the above particle diameter can be controlled by subjecting the hydrotalcite particle to pulverizing treatment or classification treatment after production.

The hydrotalcite particle may be hydrophobized with a surface treatment agent. Higher fatty acids, coupling agents, esters, and oils such as a silicone oil can be used as the surface treatment agent. Among them, the higher fatty acids are preferably used, and specific examples include stearic acid, oleic acid, and lauric acid.

The content of the hydrotalcite particle in the toner is not particularly limited, but it is preferably 0.01 parts by mass to 1.00 parts by mass and more preferably 0.05 parts by mass to 0.30 parts by mass with respect to 100 parts by mass of the toner particle. The content of the hydrotalcite particle can be quantified using a calibration curve prepared from a standard sample using fluorescent X-ray analysis.

By setting the content within the above range, it is easy to ensure the electrification rising property and the stability, the occurrence of the replenishment fog is further curbed, and it is easier to improve the solid followability.

The area ratio H1(%) of the hydrotalcite particle to the toner particle in the EDS measurement field, which is measured through the STEM-EDS mapping analysis of the toner, is preferably 0.05 to 0.50, more preferably 0.12 to 0.42, further preferably from 0.22 to 0.33. The above area ratio represents an existence ratio of the hydrotalcite particle to the toner particle.

Within the above range, it is easy to obtain the above effects of the hydrotalcite particle.

The above area ratio can be controlled by changing the amount of the hydrotalcite particle added to the toner particle.

Further, a product of an atomic concentration of the fluorine in the hydrotalcite particle, which is obtained from the main component mapping of the hydrotalcite particle through the STEM-EDS mapping analysis of the toner, H1, and 100 is defined as H2, and a product of an atomic concentration of strontium in the strontium titanate particle, which is obtained from the main component mapping of the strontium titanate particle through the STEM-EDS mapping analysis of the toner, T1, and 100 is defined as T2. H2 and T2 are respectively indicators of the amount of fluorine atoms covering the toner particle surface and the amount of strontium atoms covering the toner particle surface.

At this time, T2/H2 is preferably 0.10 to 145.00, more preferably 1.00 to 105.00, and further preferably 4.00 to 76.00. It is found that, when T2/H2 is within the above range, the dispersibility of the accumulated hydrotalcite particle and strontium titanate particle is greatly improved after long-term use of the toner, and thus it easier to form an optimal composite, the occurrence of replenishment fog is further curbed, and the solid followability is further improved.

T2/H2 can be controlled with the amount of the fluorine or the strontium introduced and the amount of the hydrotalcite particle or the strontium titanate particle added.

Further, when a number average particle diameter of primary particle of the strontium titanate particle is defined as T3 (nm), and a number average particle diameter of primary particle of the hydrotalcite particle is defined as H3 (nm), H3/T3 is preferably 0.40 to 18.00, more preferably 0.60 to 16.00, further preferably 1.30 to 13.50, and particularly preferably 5.00 to 10.00. By controlling H3/T3 within the above range, the strontium titanate particle can efficiently enter the hydrotalcite particle, and thus the electrostatic aggregation is further curbed, the occurrence of the replenishment fog is further curbed, and the electrification distribution is sharpened to further improve halftone reproducibility.

Next, the strontium titanate particle used in the present disclosure will be described.

A method for producing the strontium titanate particle is not particularly limited, but it is possible to produce the strontium titanate particle by a normal pressure heating reaction method, for example.

In a case where the strontium titanate particle is produced by a normal temperature heating reaction method, a mineral acid deflocculation product of a hydrolyzate of a titanium compound is preferably used as a titanium oxide raw material, and a water-soluble and acidic metal compound is preferably used as a metal raw material other than titanium.

The normal pressure heating reaction method will be described below.

The mineral acid deflocculation product of a hydrolyzate of a titanium compound is preferably used as the titanium oxide raw material. More preferably, metatitanic acid having a $SO_3$ content of 1.0% by mass or less (more preferably 0.5% by mass or less) obtained by a sulfuric acid method, which is adjusted to have pH 0.8 to 1.5 using hydrochloric acid and to be deflocculated, is used as the titanium oxide raw material.

A strontium raw material is not particularly limited, but it is preferable to use strontium nitrate, strontium chloride, or the like as the strontium raw material.

An alkaline aqueous solution is not particularly limited, but an aqueous solution of an alkali metal hydroxide can be used as the alkaline aqueous solution. Among them, a sodium hydroxide aqueous solution is preferable.

Since the strontium titanate particle obtained by the normal pressure heating reaction method has a perovskite crystal structure, the strontium titanate particle is preferable in terms of further improving the environmental stability of the electrification.

The number average particle diameter T3 of the primary particle of the strontium titanate particle is preferably 20 nm to 750 nm, more preferably 20 nm to 400 nm, further preferably 25 nm to 350 nm, further more preferably 27 nm to 330 nm, and particularly preferably 80 nm to 300 nm. Within this range, the charge-up curbing effect of the strontium titanate particle is easily obtained, and the complex of the strontium titanate particle and the hydrotalcite particle is easily formed. As a result, as described above, the electrification distribution can be made remarkably sharp without electrostatically aggregating the toner, and thus the occurrence of the replenishment fog can be curbed.

In the normal pressure heating reaction method, the number average particle diameter and the particle size distribution of the primary particle of the strontium titanate particle can be controlled by changing the pH at the time when the metatitanic acid is deflocculated with the hydrochloric acid, the mixing ratio of the titanium oxide raw material and the strontium raw material, the concentration of the titanium oxide raw material at the initial stage of the reaction, and the like. Furthermore, it can also be controlled by the temperature, the addition rate, the reaction time, the stirring conditions, and the like when adding the alkaline aqueous solution.

For example, if the temperature of the reaction system is rapidly lowered by putting the raw materials into ice water after the addition of the alkaline aqueous solution to stop the reaction, the reaction can be forcibly stopped in the middle of crystal growth saturation, and thus it is easy to obtain the strontium titanate particle having a wide particle size distribution. The strontium titanate particle having a wide particle size distribution can also be easily obtained by making the state of the reaction system nonuniform by reducing a stirring speed, changing a stirring method, or the like.

Further, the above particle diameter T3 can be measured using a known means such as a scanning electron microscope.

The content ratio of the titanium oxide raw material and the strontium raw material in the reaction solution at the start of the reaction is preferably such that the $SrO/TiO_2$ molar ratio in the obtained strontium titanate particle is from 0.90 to 1.40 and more preferably 1.05 and 1.20.

The concentration of the titanium oxide raw material at the start of the reaction is preferably 0.050 mol/L to 1.300 mol/L and more preferably 0.080 mol/L to 1.200 mol/L as $TiO_2$. By increasing the concentration of the titanium oxide raw material at the initial stage of the reaction, the number average particle diameter of the primary particle of the strontium titanate particle can be reduced.

The temperature at which the alkaline aqueous solution is added is not particularly limited as long as the strontium titanate particle can be obtained, but it is preferably 60° C. to 100° C. By using a pressure-resistant container such as an autoclave, the temperature can be set to 100° C. or higher.

Further, the slower the addition rate of the alkaline aqueous solution is, the larger the particle diameter of the strontium titanate particle can be obtained, and the faster the addition rate of the alkaline aqueous solution is, the smaller the particle diameter of the strontium titanate particle can be obtained. The addition rate of the alkaline aqueous solution is preferably 0.001 equivalents/h to 1.200 equivalents/h and more preferably 0.002 equivalents/h to 1.100 equivalents/h with respect to the charged raw material. These can be appropriately adjusted according to the particle diameter to be obtained.

The strontium titanate particle obtained by the normal pressure heating reaction method is preferably acid-treated in order to remove unreacted metal raw materials. After the normal pressure heating reaction is completed, the remaining unreacted strontium raw material tends to react with carbon dioxide gas in the air to generate impurities such as metal carbonates. In addition, if impurities such as metal carbonates remain on the surface of the strontium titanate particle, the impurities make it difficult for the surface treatment agent to uniformly coat the surfaces during surface treatment for imparting hydrophobicity.

The acid used for the acid treatment is not particularly limited as long as it can remove the unreacted metal raw materials, but hydrochloric acid, nitric acid, acetic acid, and the like can be used, and hydrochloric acid is preferably used. In the acid treatment, the pH of the liquid containing the strontium titanate particle is preferably 2.5 to 7.0 and more preferably 4.5 to 6.0.

The content of the strontium titanate particle is not particularly limited, but it is preferably 0.01 parts by mass to 3.00 parts by mass, more preferably 0.05 parts by mass to 0.50 parts by mass, and further preferably 0.20 parts by mass to 0.40 parts by mass with respect to 100 parts by mass of the toner particle. The content of the strontium titanate particle can be quantified using a calibration curve prepared from a standard sample using fluorescent X-ray analysis.

By setting the content within the above range, it is easy to ensure the electrification rising property and the stability, it is easy to curb the occurrence of the replenishment fog, and it is easy to improve the solid followability.

The atomic concentration of the strontium in the strontium titanate particle is not particularly limited, but it is preferably 0.01 atomic % to 5.00 atomic %, more preferably 0.10 atomic % to 4.00 atomic %, and further preferably 1.00 atomic % to 3.50 atomic %.

The atomic concentration of the strontium in the strontium titanate particle can be controlled by adjusting the concentration of the strontium during production of the strontium titanate particle. Further, the atomic concentration of the strontium in the strontium titanate particle can be obtained from the main component mapping of the strontium titanate particle through the STEM-EDS mapping analysis of the toner.

The area ratio T1(%) of the strontium titanate particle to the toner particle in the EDS measurement field, which is measured through the STEM-EDS mapping analysis of the toner, is preferably from 0.05 to 1.00, more preferably 0.10 to 0.60, further preferably 0.20 to 0.40. The above area ratio represents an existence ratio of the strontium titanate particle to the toner particle.

Within the above range, it is easy to obtain the above effects of the strontium titanate particle.

The above area ratio can be controlled by changing the amount of the strontium titanate particle added to the toner particle.

When the modal diameter (hereinafter also referred to as an aggregation diameter) in a weight-based particle size distribution of the strontium titanate particle adhering to the surface of the toner particle is defined as T4 (nm), T4 is preferably 50 nm to 1700 nm, more preferably from 50 nm to 450 nm, further preferably 55 nm to 400 nm, and particularly preferably 70 nm to 250 nm. By controlling the modal diameter within the above range, it is possible to achieve both improved fluidity and durability, and for example, it is difficult to cause image defects due to development streaks throughout durability. Here, the aggregation diameter is mainly obtained by measuring secondary particle of the strontium titanate particle, and a measurement target may include the primary particle of the strontium titanate particle. Further, the secondary particle is aggregates formed by aggregation of the primary particle.

In addition, H3/T4 is preferably 0.40 to 8.00, more preferably 0.30 to 7.30, and further preferably 1.00 to 5.00. When the aggregation diameter T4 and H3/T4 are within the above ranges, the hydrotalcite particle and the strontium titanate particle are present with appropriate particle diameters on the toner surface, thereby improving the toner fluidity. In addition, the complex in the developing device has a proper particle diameter and high dispersibility. As a result, development streaks caused by the toner and migrated external additives remaining in a development regulating portion are reduced, which is preferable. The aggregation diameter T4 can be measured by disk centrifugal particle size distribution measurement which will be described later.

The aggregation diameter T4 can be controlled with the external addition intensity and the external addition time.

The strontium titanate particle may be surface-treated with a surface treatment agent. The surface treatment agent is not particularly limited, but examples of the surface treatment agent include a disilylamine compound, a halogenated silane compound, a silicone compound, and a silane coupling agent.

The disilylamine compound is a compound having a disilylamine (Si—N—Si) moiety. Examples of the disilylamine compound include hexamethyldisilazane (HMDS), N-methyl-hexamethyldisilazane, and hexamethyl-N-propyldisilazane.

Examples of the halogenated silane compound include dimethyldichlorosilane.

Examples of the silicone compound include a silicone oil and a silicone resin (a varnish). Examples of the silicone oil include a dimethylsilicone oil, a methylphenylsilicone oil, an α-methylstyrene-modified silicone oil, a chlorophenylsilicone oil, and a fluorine-modified silicone oil. Examples of the silicone resin (the varnish) include a methylsilicone varnish and a phenylmethylsilicone varnish.

Examples of the silane coupling agent include a silane coupling agent having an alkyl group and an alkoxy group, a silane coupling agent having an amino group and an alkoxy group, and a fluorine-containing silane coupling agent. More specifically, examples of the silane coupling agent include dimethyldimethoxysilane, dimethyldiethoxysilane, diethyldimethoxysilane, diethyldiethoxysilane, trimethylmethoxysilane, trimethylethoxysilane, triethylmethoxysilane, triethylethoxysilane, γ-glycidoxypropyltrimethoxysilane, γ-chloropropyltrimethoxysilane, γ-aminopropyltrimethoxysilane, γ-aminopropyltriethoxysilane, γ-aminopropyldimethoxymethylsilane, γ-aminopropyldiethoxymethylsilane, 3,3,3-trifluoropropyldimethoxysilane, 3,3,3-trifluoropropyldiethoxysilane, perfluorooctylethyltriethoxysilane, 1,1,1-trifluorohexyldiethoxysilane, and the like.

In particular, treatment with fluorine-based silane coupling agents such as trifluoropropyltrimethoxysilane and perfluorooctylethyltriethoxysilane is preferred.

The surface treatment agents described above may be used singly or in combination of two or more. A preferable amount of the surface treatment agent is 0.5 to 20.0 parts by mass with respect to 100 parts by mass of the strontium titanate particle.

Methods for producing components that constitute the toner and a method for producing the toner will now be explained in greater detail.

Binder Resin

The toner particle contains a binder resin.

For the binder resin, the following resins and polymers can be given as examples of polyester resins, vinyl-based resins, and other binder resins. Examples thereof include styrene acrylic resins, polyester resins, epoxy resins, polyurethane resins, polyamide resins, cellulose resins, polyether resins, and mixed resins and complex resins of these.

From the perspectives of being inexpensive and easy to procure and exhibiting excellent low-temperature fixability, the binder resin is preferably a polyester resin, a styrene acrylic resin or a hybrid resin of these, and is more preferably a styrene acrylic resin.

The polyester resin can be obtained by using a conventional well-known method, such as a transesterification method or a polycondensation method, by selecting and combining appropriate materials from among polycarboxylic acids, polyols, hydroxycarboxylic acids, and the like.

A polycarboxylic acid is a compound having 2 or more carboxyl groups per molecule. Of these, a dicarboxylic acid is a compound having 2 carboxyl groups per molecule, and is preferably used.

Examples of dicarboxylic acids include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

Examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having 2 or more hydroxyl groups per molecule. Of these, a diol is a compound having 2 hydroxyl groups per molecule, and is preferably used.

Specific examples include ethylene glycol, diethylene glycol, triethylene glycol, 1,2-propylene glycol, 1,3-propylene glycol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, 1,4-cyclohexane diol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred.

Examples of trihydric or higher polyols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher polyols in isolation or a combination of two or more types thereof. In addition, the polyester resin may be a urea group-containing polyester resin. The polyester resin is preferably one in which a carboxyl group at a terminal or the like is not capped.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth) acrylic acid and maleic acid;

Vinyl ether-based monomers such as vinyl methyl ether and vinyl isobutyl ether; and vinyl ketone-based monomers such as vinyl methyl ketone, vinyl ethyl ketone and vinyl isopropenyl ketone;

Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl) propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy) hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sodium compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added amount of polymerization initiator varies according to the target degree of polymerization, but is generally an amount of from 0.5 parts by mass to 20.0 parts by mass relative to 100.0 parts by mass of polymerizable monomer.

Crosslinking Agent

To control the molecular weight of the binder resin constituting the toner particle, a crosslinking agent may also be added during polymerization of the polymerizable monomers.

Examples include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis (4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and these with methacrylate substituted for the acrylate.

The added amount of the crosslinking agent is preferably from 0.001 to 15.000 mass parts per 100 mass parts of the polymerizable monomers.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes and polypropylene waxes, and natural waxes and derivatives thereof, such as carnauba wax and candelilla wax. Derivatives include oxides, block copolymers formed with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Of these, use of a polyolefin, a hydrocarbon wax produced using the Fischer Tropsch process or a petroleum-based wax is preferred from the perspectives of developing performance and transferability being improved. That is, wax preferably comprises a hydrocarbon wax or a petroleum-based wax. Moreover, antioxidants may be added to these waxes as long as the characteristics of the toner are not adversely affected.

In addition, from the perspectives of phase separation from the binder resin and crystallization temperature, preferred examples include higher fatty acid esters such as behenyl behenate and dibehenyl sebacate.

The content of the release agent is preferably from 1.0 parts by mass to 30.0 parts by mass relative to 100.0 parts by mass of the binder resin.

The melting point of the release agent is preferably from 30° C. to 120° C., and more preferably from 60° C. to 100° C. By using a release agent having a melting point of from 30° C. to 120° C., a releasing effect is efficiently achieved and a broader fixing range is ensured.

Plasticizer

A crystalline plasticizer is preferably used in order to improve the sharp melt properties of the toner. The plasticizer is not particularly limited, and well-known plasticizers used in toners, such as those listed below, can be used.

Examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof.

Coloring Agent

The toner particle may comprise a coloring agent. Examples of the coloring agent include the following.

Examples of a black coloring agent include carbon black, a black magnetic material, and a black coloring agent obtained by using a yellow coloring agent, a magenta coloring agent, and a cyan coloring agent. A pigment may be used alone as the coloring agent, but it is more preferable to use a dye and a pigment in combination to improve the definition from the viewpoint of image quality of a full-color image.

Examples of the magenta coloring pigment include the following. C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Vat Red 1, 2, 10, 13, 15, 23, 29, 35.

Examples of the magenta coloring dye include the following. Oil-soluble dyes such as C. I. Solvent Red 1, 3, 8, 23, 24, 25, 27, 30, 49, 81, 82, 83, 84, 100, 109, 121; C. I. Disperse Red 9; C. I. Solvent Violet 8, 13, 14, 21, 27; C. I. Disperse Violet 1, Basic dyes such as C. I. Basic Red 1, 2, 9, 12, 13, 14, 15, 17, 18, 22, 23, 24, 27, 29, 32, 34, 35, 36, 37, 38, 39, 40; C. I. Basic Violet 1, 3, 7, 10, 14, 15, 21, 25, 26, 27, 28.

Examples of the cyan coloring pigment include the following. C. I. Pigment Blue 2, 3, 15:2, 15:3, 15:4, 16, 17; C. I. Vat Blue 6; C. I. Acid Blue 45, a copper phthalocyanine pigment having a phthalocyanine skeleton substituted with 1 to 5 phthalimidomethyl groups.

Examples of the cyan coloring dye include C. I. Solvent Blue 70.

Examples of the yellow coloring pigment include the following. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Vat Yellow 1, 3, 20.

Examples of the yellow coloring dye include C. I. Solvent Yellow 162.

The content of the above coloring agent is preferably 0.1 to 30 parts by mass with respect to 100 parts by mass of a binder resin.

Charge Control Agent

Examples of a charge control agent include the following. As the charge control agent, an organometallic compound and a chelate compound are effective, and examples thereof include a monoazo metal compound, an acetylacetone metal compound, aromatic oxycarboxylic acid-based metal compounds, aromatic dicarboxylic acid-based metal compounds, oxycarboxylic acid-based metal compounds, and dicarboxylic acid-based metal compounds. In addition, a quaternary ammonium salt and a resin type charge control agent can also be used. Examples of the resin type charge control agent include a resin having a sulfonic functional group such as a sulfonic acid group, a sulfonate group, and a sulfonic acid ester group, and a resin having a carboxyl group. These charge control agents can be used alone or in combination of two or more.

A preferred blending amount of the charge control agent is from 0.01 to 20.00 parts by mass and more preferably 0.50 to 10.00 parts by mass with respect to 100 parts by mass of the binder resin.

Method for Producing Toner Particle

A method for producing the toner particle is not particularly limited, a known means can be used, and a kneading pulverization method or a wet production method can be used. The wet production method is preferable from the viewpoint of uniformity of the particle diameter, shape controllability, and ease of obtaining a toner particle having a core-shell structure. Examples of the wet production method can include a suspension polymerization method, a dissolution suspension method, an emulsion polymerization aggregation method, an emulsion aggregation method, and the like. Here, the emulsion aggregation method is more preferable from the viewpoint of dispersing the hydrotalcite particle on the surface of the toner particle and inside the toner particle. The reason for this is that, due to the presence of the hydrotalcite particle, the generated charge is dispersed inside the toner, leading to further stabilization of the electrification property of the toner.

The emulsion aggregation method is performed by the following procedure.

First, a dispersion liquid of a material such as fine particle of the binder resin and the coloring agent is prepared. The obtained dispersion liquid of each material is dispersed and mixed by adding a dispersion stabilizer thereinto as necessary. After that, the toner particle is aggregated to have a desired particle diameter by adding an aggregating agent thereinto, and thereafter or simultaneously with the aggregation, fusing is performed between the resin fine particle. Further, as necessary, the toner particle is formed by shape control with heat.

Here, the fine particle of the binder resin can also be composite particle formed of a plurality of layers of two or more layers made of resins having different compositions. For example, the toner particle can be produced by an emulsion polymerization method, a mini-emulsion polymerization method, a phase inversion emulsification method, or a combination of some production methods. In a case where an internal additive is contained in the toner particle, the internal additive may be contained in the resin fine particle. Further, a dispersion liquid of internal additive fine particle containing only the internal additive may be separately prepared, and when the internal additive fine particle and the resin fine particle are aggregated, they may be aggregated together. In addition, the toner particle having a layer structure with different compositions can be produced by adding the resin fine particle with different compositions at the time of aggregation and causing them to aggregate.

Specifically, after core particle is formed by an aggregating step, a shell forming step in which resin fine particle for a shell are further added and agglomerated to form a shell can be provided. As a resin for a shell, a resin having the same composition as a resin for a core may be used, or a resin having a different composition may be used.

The amount of the resin for a shell added is preferably 1 to 10 parts by mass and more preferably 2 to 7 parts by mass with respect to 100 parts by mass of the binder resin contained in the core particle.

In this case, the toner production method preferably has the following steps.

(1) a dispersion step for preparing a dispersed solution of binder resin fine particle that contain the binder resin, (2) an aggregation step for aggregating binder resin fine particle contained in the dispersed solution of binder resin fine particle so as to form aggregates, (3) a shell formation step for further adding resin fine particle containing a shell-forming resin to the dispersed solution containing the aggregates, causing the resin fine particle to aggregate, and forming aggregates having a shell, and (4) a fusion step for heating and fusing the aggregates In addition, the toner production method preferably has (5) a heat sphering step for further increasing the temperature of the aggregates either during step (4) or after steps (1) to (4).

In addition, the toner production method more preferably has the following steps (6) and (7) after step (5).

(6) A cooling step for cooling the aggregates at a cooling rate of 0.1° C./sec or more (7) Following the cooling step, an annealing step for heating and holding the aggregates at a temperature that is not lower than the crystallization temperature or glass transition temperature of the binder resin Substances listed below can be used as dispersion stabilizers.

Well-known cationic surfactants, anionic surfactants and non-ionic surfactants can be used as surfactants.

Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. In addition, examples of organic dispersion stabilizers include poly (vinyl alcohol), gelatin, methyl cellulose, methylhydroxypropyl cellulose, ethyl cellulose, sodium carboxymethyl cellulose and starch.

In addition to surfactants having the opposite polarity from surfactants used in the dispersion stabilizers mentioned above, inorganic salts and divalent or higher inorganic metal salts can be advantageously used as flocculants. Inorganic metal salts are particularly preferred from the perspectives of facilitating control of aggregation properties and toner charging performance due to polyvalent metal elements being ionized in aqueous media.

Specific examples of preferred inorganic metal salts include metal salts such as calcium chloride, calcium nitrate, barium chloride, magnesium chloride, zinc chloride, iron chloride, aluminum chloride and aluminum sulfate; and inorganic metal salt polymers such as iron polychloride, aluminum polychloride, aluminum polyhydroxide and calcium polysulfide. Of these, aluminum salts and polymers thereof are particularly preferred. In order to attain a sharper particle size distribution, it is generally preferable for the valency of an inorganic metal salt to be divalent rather than monovalent and trivalent or higher rather than divalent, and an inorganic metal salt polymer is more suitable for a given valency.

From the perspectives of high image precision and resolution, the volume-based median diameter of the toner particle is preferably from 3.0 μm to 10.0 μm.

Method for Producing Toner

The toner comprises the hydrotalcite particle and the strontium titanate particle as external additives. Other external additives may be added as necessary. In this case, the content of external additives such as inorganic and organic fine particle including the hydrotalcite particle and the strontium titanate particle is preferably 0.50 parts by mass to 5.00 parts by mass in total with respect to 100 parts by mass of the toner particle.

A mixer for externally adding the external additives to the toner particle is not particularly limited, and known mixers can be used regardless of whether they are dry or wet. For example, FM Mixer (manufactured by Nippon Coke Kogyo Co., Ltd.), Super Mixer (manufactured by Kawata Co., Ltd.), Nobilta (manufactured by Hosokawa Micron Co., Ltd.), Hybridizer (manufactured by Nara Machinery Co., Ltd.), and the like are enumerated. In order to control the presence state of the external additives, such as the coating state of the external additives, the toner can be prepared by adjusting the rotational speed of the external addition device, the processing time, and the water temperature and amount of a jacket.

Further, examples of a sieving device used for sieving coarse particle after external addition include Ultrasonic (manufactured by Koei Sangyo Co., Ltd.); Resona Sieve, Gyro Shifter (Tokuju Kosakusho Co., Ltd.); Vibra Sonic System (manufactured by Dalton Co., Ltd.); Soniclean (manufactured by Sintokogyo Co., Ltd.); Turbo Screener (manufactured by Turbo Kogyo Co., Ltd.); and Micro Shifter (manufactured by Makino Sangyo Co., Ltd.).

Methods for measuring physical properties of the toner and each material will be described below.

Method for Identifying Hydrotalcite Particle and Strontium Titanate Particle

Identification of the hydrotalcite particle and the strontium titanate particle can be performed by combining shape observation by scanning electron microscope (SEM) and elemental analysis by energy dispersive X-ray spectroscopy (EDS).

Using a scanning electron microscope "S-4800" (a trade name, manufactured by Hitachi Ltd.), the toner is observed in a field magnified up to 50,000 times. The external additive to be discriminated is observed by focusing on the toner particle surface. The energy dispersive X-ray spectroscopy (EDS) is performed on the external additive to be discriminated, and the hydrotalcite particle and the strontium titanate particle can be identified from the type of an elemental peak.

In case where an elemental peak of at least one metal selected from the group consisting of Mg, Zn, Ca, Ba, Ni, Sr, Cu, and Fe, which are metals that can constitute the hydrotalcite particle, and an elemental peak of at least one metal selected from the group consisting of Al, B, Ga, Fe, Co, and In are observed as the elemental peak, it is possible to presume that the hydrotalcite particle containing the above two metals are present.

Similarly, in a case where elemental peaks of Sr and Ti, which are metals constituting the strontium titanate particle, are detected as elemental peaks, it is possible to presume that the strontium titanate is present.

Specimens of the hydrotalcite particle and the strontium titanate particle presumed by the EDS analysis are separately prepared, and the shape observation by the SEM and the EDS analysis are performed. The analysis results of the specimens are compared with the analysis result of the particle to be discriminated in order to determine whether or not they match each other, and thus it is determined whether or not they are the hydrotalcite particle and the strontium titanate particle.

Method for Measuring Elemental Ratio of Hydrotalcite Particle and Strontium Titanate Particle The elemental ratios of the hydrotalcite particle and the strontium titanate particle are measured through EDS mapping measurement of the toner using a scanning transmission electron microscope (STEM). In the EDS mapping measurement, spectral data for each picture element (pixel) in the analysis area is used. EDS mapping can be measured with high sensitivity by using a silicon drift detector with a large detection element area.

By statistically analyzing the spectral data of each pixel obtained through the EDS mapping measurement, main component mapping in which pixels with similar spectra are extracted can be obtained, enabling mapping with specified components.

A sample for observation is prepared according to the following procedure.

0.5 g of the toner is weighed and placed in a cylindrical mold with a diameter of 8 mm using a Newton press under a load of 40 kN for 2 minutes to prepare a cylindrical toner pellet with a diameter of 8 mm and a thickness of about 1 mm. 200 nm thick flakes are produced from the toner pellet by an ultramicrotome (Leica, FC7).

STEM-EDS analysis is performed using the following device and conditions.

- Scanning transmission electron microscope: JEM-2800 manufactured by JEOL Ltd.
- EDS detector: JED-2300T dry SD100GV detector (detection element area: 100 mm2) manufactured by JEOL Ltd.
- EDS analyzer: NORAN System 7 manufactured by Thermo Fisher Scientific Ltd.
- STEM-EDS Conditions
  - STEM acceleration voltage: 200 kV
  - Magnification: 20,000 times
  - Probe size 1 nm
- STEM image size: 1024×1024 pixels (to obtain an EDS elemental mapping image at the same position)
- EDS mapping size: 256×256 pixels, Dwell Time: 30 μs, accumulation count: 100 frames Each elemental ratio in the hydrotalcite particle and the strontium titanate particle based on multivariate analysis is calculated as follows.

The EDS mapping is obtained by the above STEM-EDS analyzer. Next, the multivariate analysis is performed on the collected spectral mapping data using a COMPASS (PCA) mode in a measurement command of the NORAN System 7 described above to extract a main component map image.

At that time, the setting values are as follows.

Kernel size: 3×3

Quantitative map setting: high (late)·

Filter fit type: high precision (slow)

At the same time, through this operation, the area ratio of each extracted main component in the EDS measurement field is calculated. Quantitative analysis is performed on the EDS spectrum of the obtained main component mapping by a Cliff-Lorimer method.

The toner particle portion, the hydrotalcite particle, and the strontium titanate particle are distinguished on the basis of the above quantitative analysis results of the obtained STEM-EDS main component mapping. The particle can be identified as the hydrotalcite particle from the particle size, the shape, the content of polyvalent metals such as aluminum and magnesium, and the amount ratio thereof. Similarly, the particle can be identified as the strontium titanate particle from the particle size, the shape, the content of polyvalent metals such as titanium and strontium, and the amount ratio thereof.

Method for Analyzing Fluorine and Aluminum in Hydrotalcite Particle

On the basis of the mapping data of the STEM-EDS mapping analysis obtained by the method described above, the hydrotalcite particle are analyzed for the fluorine and the aluminum. Specifically, the EDS line analysis is performed in a direction normal to the outer periphery of the hydrotalcite particle to analyze the fluorine and the aluminum present inside the particle.

A schematic diagram of the line analysis is shown in FIG. 1A. For the hydrotalcite particle 3 adjacent to the toner particle 1 and the toner particle 2, line analysis is performed in a direction normal to the outer periphery of the hydrotalcite particle 3, that is, in a direction of 5. Reference sign 4 indicates a boundary between the toner particle.

A range in which hydrotalcite particle is present in an acquired STEM image is selected with a rectangular selection tool, and the line analysis is performed under the following conditions.

Line Analysis Conditions

STEM magnification: 800,000 times

Line length: 200 nm

Line width: 30 nm

The number of line divisions: 100 points (intensity measurement every 2 nm)

In a case where the elemental peak intensity of the fluorine or the aluminum is 1.5 times or more the background intensity in the EDS spectrum of the hydrotalcite particle, and in a case where the elemental peak intensity of the fluorine or the aluminum at each of both end portions (a point a and a point b in FIG. 1A) of the hydrotalcite particle in the line analysis does not exceed 3.0 times the peak intensity at a point c, the element is determined to be contained inside the hydrotalcite particle. The point c is a midpoint of a line segment ab (that is, a midpoint between both end portions).

Figure 1B:
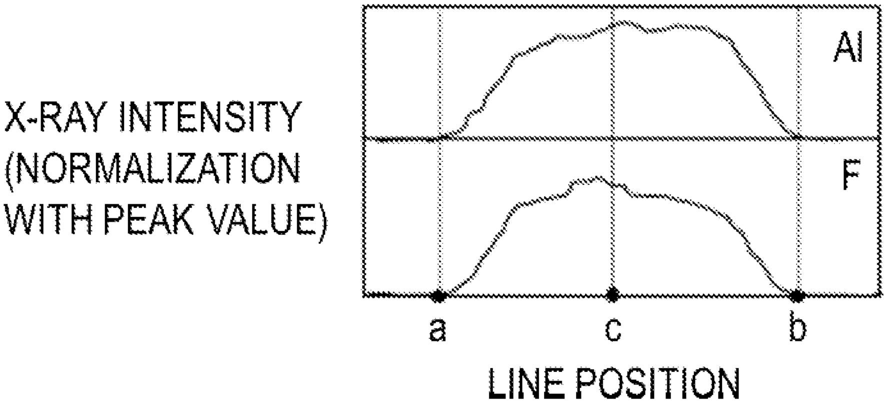
Figure 1C:
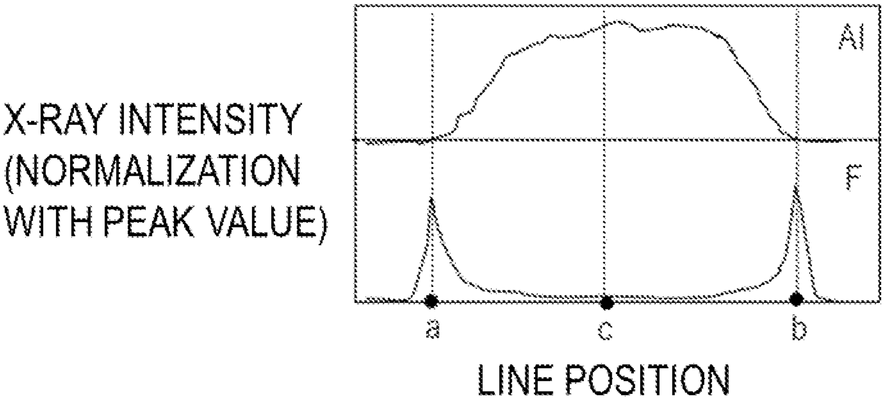

Examples of X-ray intensities of the fluorine and the aluminum obtained through the line analysis are shown in FIGS. 1B and 1C. In a case where the hydrotalcite particle contain the fluorine and the aluminum inside, a graph of the X-ray intensity normalized with the peak intensity shows a shape as shown in FIG. 1B. In a case where the hydrotalcite particle contain fluorine derived from the surface treatment agent, a graph of the X-ray intensity normalized with the peak intensity has a peak near each of the points a and b at both end portions in a graph of the fluorine as shown in FIG. 1C. By checking the X-ray intensity derived from the fluorine and the aluminum in the line analysis, it can be verified that the hydrotalcite particle contain the fluorine and the aluminum inside.

Method for Calculating Ratio (Elemental Ratio) F/Al in Atomic Concentration of Fluorine to Aluminum in Hydrotalcite Particle By acquiring a value of a ratio F/Al (an elemental ratio) in an atomic concentration of the fluorine to the aluminum in the hydrotalcite particle, which is obtained from the main component mapping derived from the hydrotalcite particle through the STEM-EDS mapping analysis described above, in a plurality of fields, and by obtaining an arithmetic average of 100 or more particles, the ratio (the elemental ratio) F/Al in the atomic concentration of the fluorine to the aluminum in the hydrotalcite particle is obtained.

Method for Calculating Area Ratios H1 and T1 of Hydrotalcite Particle and Strontium Titanate Particle to Toner Particle and T1/H1

On the basis of the mapping data of the STEM-EDS mapping analysis obtained by the method described above, the area ratio of each extracted main component to the toner particle can be calculated. The value obtained by taking the "area ($nm^2$) of the hydrotalcite particle" as the numerator and the "sum of the area ($nm^2$) of the hydrotalcite particle and the area ($nm^2$) of the toner particle" as the denominator is calculated as the area ratio H1 of the hydrotalcite particle to the toner particle.

Similarly, the value obtained by taking the "area ($nm^2$) of the strontium titanate particle" as the numerator and the "sum of the area ($nm^2$) of the strontium titanate particle and the area ($nm^2$) of the toner particle" as the denominator is calculated as the area ratio T1 of the strontium titanate particle to the toner particle.

The mapping data are acquired in a plurality of fields, and the area ratio H1(%) of the hydrotalcite particle to the toner particle in the EDS measurement field and the area ratio T1(%) of the strontium titanate particle to the toner particle in the EDS measurement field are calculated. The arithmetic averages of the 30 fields are assumed to be the area ratios H1 and T1.

Then, T1/H1 is calculated from the obtained H1 and T1.

Method for Calculating Atomic Concentration of Fluorine in Hydrotalcite Particle, Atomic Concentration of Strontium in Strontium Titanate Particle, and T2/H2

On the basis of the mapping data of the STEM-EDS mapping analysis obtained by the method described above, the atomic concentration of the fluorine in the hydrotalcite particle and the atomic concentration of the strontium in the strontium titanate particle are calculated. In the main component map images of the hydrotalcite particle and the strontium titanate particle, which are extracted by the above-mentioned method, the atomic concentration (the elemental amount) of the fluorine in the hydrotalcite particle and the atomic concentration (the elemental content) of the strontium in the strontium titanate particle are quantified. H2 and T2 are respectively calculated by multiplying the atomic concentration of the fluorine in the hydrotalcite particle by H1 and 100, and by multiplying the atomic concentration of the strontium in the strontium titanate particle by T1 and 100.

H2 and T2 are obtained by acquiring the mapping data in a plurality of fields and by taking the arithmetic average of 100 or more hydrotalcite particle and 100 or more strontium titanate particle.

Then, T2/H2 is calculated from the obtained H2 and T2.

Method for Measuring Number Average Particle Diameter H3 of Primary Particle of Hydrotalcite Particle and Number Average Particle Diameter T3 of Primary Particle of Strontium Titanate Particle The number average particle diameter H3 of the primary particle of the hydrotalcite particle and the number average particle diameter T3 of the primary particle of the strontium titanate particle are measured by combining a scanning electron microscope "S-4800" (a trade name, manufactured by Hitachi, Ltd.) and elemental analysis through the energy dispersive X-ray spectroscopy (EDS). The toner to which the hydrotalcite particle and the strontium titanate particle are externally added as the external additives is observed, and the hydrotalcite particle and the strontium titanate particle are photographed in a field magnified up to 200,000 times. The hydrotalcite particle and the strontium titanate particle are selected from the photographed images, the major diameters of the primary particle of 100 hydrotalcite particles and 100 strontium titanate particles are measured at random, and the number average particle diameter of the hydrotalcite particle and the number average particle diameter of the strontium titanate particle are obtained. The observation magnification is appropriately adjusted according to the size of the external additive.

Method for Measuring Aggregation Diameter T4 of Strontium Titanate Particle

The aggregation diameter T4 of the strontium titanate particle is measured using a disk centrifugal particle size distribution measuring device DC24000 manufactured by CPS Instruments Inc. The measurement method will be shown below.

First, 0.5 mg of Triton-X100 (manufactured by Kishida Chemical Co., Ltd.) as a dispersant is added to 100 g of ion-exchanged water to prepare a dispersion medium. 0.6 g of the toner is added to 9.4 g of this dispersion medium and dispersed for 5 minutes with an ultrasonic dispersion device. After that, a syringe needle dedicated to a measuring device manufactured by CPS Instruments Inc. is attached to the front side of all plastic disposable syringe (Tokyo Glass Instruments Co., Ltd.) equipped with a syringe filter (diameter: 13 mm/pore size 0.45 μm) (manufactured by Advantec Toyo Co., Ltd.), and 0.1 mL of a supernatant is collected. The supernatant collected with a syringe is injected into a disk centrifugal particle size distribution measuring device DC24000, and the modal diameter (the aggregation diameter) T4 in the weight-based particle size distribution of the strontium titanate particle adhering to the surface of the toner particle is measured. Here, the aggregation diameter is mainly obtained by measuring secondary particle of the strontium titanate particle, and a measurement target may include the primary particle of the strontium titanate particle. Further, the secondary particle are aggregates formed by aggregation of the primary particle.

The details of the measurement method are as follows.

First, the disk is rotated at 24000 rpm with Motor Control on the CPS software. After that, the following conditions are set from the Procedure Definitions.

(1) Sample Parameters
- Maximum diameter: 0.5 μm
- Minimum diameter: 0.05 μm
- Particle density: 3.5 g/mL (it is appropriately adjusted according to the sample)
- Particle refractive index: 1.43
- Particle absorption: OK
- Non-sphericity factor: 1.1

(2) Calibration Standard Parameters
- Peak diameter: 0.226 μm
- Half height peak width: 0.1 μm
- Particle density: 1.389 g/mL
- Fluid density: 1.059 g/mL
- Fluid refractive index: 1.369
- Fluid viscosity: 1.1 cps After the setting of the above conditions, a density gradient solution is prepared from an 8 wt % sucrose aqueous solution and a 24 wt % sucrose aqueous solution using an auto gradient maker AG300 manufactured by CPS Instruments Inc., and 15 mL of the density gradient solution is injected into a measurement container.

After the injection, in order to prevent evaporation of the density gradient solution, 1.0 mL of dodecane (manufactured by Kishida Chemical Co., Ltd.) is injected to form an oil film, and the device is kept on standby for 30 minutes or more for stabilization.

After the standby, standard particles for calibration (weight-based median particle diameter: 0.226 μm) are injected into the measuring device with a 0.1 mL syringe to perform calibration. After that, the above collected supernatant is injected into the device, and the peak top (a modal diameter) of the weight-based particle size distribution observed at 30 nm to 500 nm is read.

Method for Measuring Average Circularity and Aspect Ratio of Toner (Particle)

The average circularity of the toner or the toner particle is measured using a flow type particle image analyzer "FPIA-3000" (manufactured by Sysmex Corporation) under the measurement and analysis conditions during calibration work.

After an appropriate amount of a surfactant and an alkylbenzenesulfonate are added to 20 mL of ion-exchanged water as a dispersant, 0.02 g of a measurement sample is added thereto, and dispersion treatment is performed using a tabletop type ultrasonic cleaning and dispersion device with an oscillation frequency of 50 kHz and an electrical output of 150 watts (a trade name: VS-150, manufactured by Vervoclear Co., Ltd.) for 2 minutes to obtain a dispersion liquid for measurement. At that time, the temperature of the dispersion liquid is appropriately cooled to 10° C. to 40° C.

For the measurement, the above-mentioned flow type particle image analyzer equipped with a standard objective lens (10 times) is used, and a particle sheath "PSE-900A" (manufactured by Sysmex Corporation) is used as a sheath liquid. The dispersion liquid prepared according to the above procedure is introduced into the flow type particle image analyzer, 3000 toners (toner particles) are measured in the HPF measurement mode and the total count mode, and the average circularity and the aspect ratio of the toners (the toner particles) are obtained by setting the binarization threshold during particle analysis to 85% and limiting the analyzed particle diameter to a circle equivalent diameter of 1.98 μm to 19.92 μm.

In the measurement, automatic focus adjustment is performed using standard latex particles (diluted with, for example, 5100A (a trade name) manufactured by Duke Scientific Co., Ltd. as ion-exchanged water) before starting the measurement. After that, it is preferable to perform focus adjustment every two hours from the start of measurement.

Method for Measuring Particle Diameter, Such as Volume-Based Median Diameter, of Toner The particle diameter such as volume-based median diameter of the toner is calculated as follows. A "Multisizer 3 Coulter Counter" precise particle size distribution analyzer (registered trademark, Beckman Coulter, Inc.) based on the pore electrical resistance method and equipped with a 100 μm aperture tube is used as the measurement unit together with the accessory dedicated "Beckman Coulter Multisizer 3 Version 3.51" software (Beckman Coulter, Inc.) for setting the measurement conditions and analyzing the measurement data. Measurement is performed with 25,000 effective measurement channels.

The aqueous electrolytic solution used in measurement may be a solution of special grade sodium chloride dissolved in ion-exchanged water to a concentration of about 1 mass %, such as "ISOTON II" (Beckman Coulter, Inc.) for example.

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained with "Standard particles 10.0 μm" (Beckman Coulter, Inc.). The threshold and noise level are set automatically by pushing the "Threshold/noise level measurement" button. The current is set to 1600 μA, the gain to 2, and the electrolytic solution to ISOTON II, and a check is entered for "Aperture tube flush after measurement".

On the "Conversion settings from pulse to particle diameter" screen of the dedicated software, the bin interval is set to the logarithmic particle diameter, the particle diameter bins to 256, and the particle diameter range to 2 to 60 μm.

The specific measurement methods are as follows.

(1) About 200 mL of the aqueous electrolytic solution is placed in a glass 250 mL round-bottomed beaker dedicated to the Multisizer 3, the beaker is set on the sample stand, and stirring is performed with a stirrer rod counter-clockwise at a rate of 24 rps. Contamination and bubbles in the aperture tube are then removed by the "Aperture tube flush" function of the dedicated software.

(2) 30 mL of the same aqueous electrolytic solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries, Ltd.) diluted about three times by mass with ion-exchange water is added.

(3) An ultrasonic disperser "Ultrasonic Dispersion System Tetra150" (Nikkaki Bios Co., Ltd.) with an electrical output of 120 W equipped with two built-in oscillators having an oscillating frequency of 50 kHz with their phases shifted by 180° from each other is prepared. About 3.3 L of ion-exchange water is added to the water tank of the ultrasonic disperser, and about 2 mL of Contaminon N is added to the tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolytic solution in the beaker.

(5) The aqueous electrolytic solution in the beaker of (4) above is exposed to ultrasound as about 10 mg of toner is added bit by bit to the aqueous electrolytic solution, and dispersed. Ultrasound dispersion is then continued for a further 60 seconds. During ultrasound dispersion, the water temperature in the tank is adjusted appropriately to from 10° C. to 40° C.

(6) The aqueous electrolytic solution of (5) above with the toner dispersed therein is dripped with a pipette into the round-bottomed beaker of (1) above set on the sample stand, and adjusted to a measurement concentration of about 5%. Measurement is then performed until the number of measured particles reaches 50000.

(7) The volume-based median diameter is calculated by analyzing measurement data using the accompanying dedicated software.

EXAMPLES

The present invention will be described in more detail below with reference to examples and comparative examples, but the present invention is not limited to these. "Parts" used in the examples are based on mass unless otherwise specified.

Preparation of Hydrotalcite Particle 1

A mixed aqueous solution of 1.03 mol/L of magnesium chloride and 0.239 mol/L of aluminum sulfate (A liquid), a 0.753 mol/L of sodium carbonate aqueous solution (B liquid), and 3.39 mol/L of sodium hydroxide aqueous solution (C liquid) was prepared.

Next, A liquid, B liquid, and C liquid were poured into the reaction tank at a flow rate that would give a volume ratio of 4.5:1 of A liquid:B liquid using a metering pump, a pH value of the reaction liquid was maintained in the range of 9.3 to 9.6 with C liquid, and the reaction temperature was 40° C. to form a precipitate. After filtration and washing, the precipitate was re-emulsified with ion-exchanged water to obtain a raw material hydrotalcite slurry. The concentration of the hydrotalcite in the obtained hydrotalcite slurry was 5.6% by mass.

The obtained hydrotalcite slurry was vacuum dried overnight at 40° C. NaF was dissolved in the ion-exchanged water to have a concentration of 100 mg/L, a solution adjusted to pH 7.0 using 1 mol/L of HCl or 1 mol/L of NaOH was prepared, and the dried hydrotalcite was added to the adjusted solution at a proportion of 0.1% (w/v %). Stirring was carried out at a constant speed for 48 hours using a magnetic stirrer to prevent sedimentation. Then, the hydrotalcite slurry was filtered through a membrane filter with a pore size of 0.5 μm and washed with the ion-exchanged water. The obtained hydrotalcite was vacuum dried overnight at 40° C. and then pulverized until the desired particle diameter was obtained. Table 1 shows the composition and the physical properties of the obtained hydrotalcite particle 1.

Preparation of Hydrotalcite Particle 2 to 13

Hydrotalcite particle 2 to 13 were obtained in the same manner as in the production example of the hydrotalcite particle 1 except that A liquid:B liquid, the concentration of NaF aqueous solution, and the pulverizing strength were appropriately adjusted. Table 1 shows the compositions and the physical properties of the obtained hydrotalcite particle 2 to 13.

Preparation of Hydrotalcite Particle 14

Hydrotalcite particle 14 were obtained in the same manner as in the production example of the hydrotalcite particle 1 except that the ion-exchanged water was used instead of the NaF aqueous solution in the production example of the hydrotalcite particle 1. Table 1 shows the composition and the physical properties of the obtained hydrotalcite particle 14.

TABLE 1

| Hydrotalcite particle | Mg atomic % | Al atomic % | F atomic % | F/Al ratio | Number average particle diameter H3 (nm) |
|---|---|---|---|---|---|
| Hydrotalcite particle 1 | 11.12 | 5.27 | 0.62 | 0.12 | 400 |
| Hydrotalcite particle 2 | 11.12 | 5.27 | 0.25 | 0.05 | 400 |
| Hydrotalcite particle 3 | 11.12 | 5.27 | 0.22 | 0.04 | 400 |
| Hydrotalcite particle 4 | 11.12 | 5.27 | 0.10 | 0.02 | 400 |
| Hydrotalcite particle 5 | 11.12 | 5.20 | 0.05 | 0.01 | 400 |
| Hydrotalcite particle 6 | 11.12 | 5.27 | 1.60 | 0.30 | 400 |
| Hydrotalcite particle 7 | 11.12 | 5.27 | 3.14 | 0.60 | 400 |
| Hydrotalcite particle 8 | 11.12 | 5.27 | 3.41 | 0.65 | 400 |
| Hydrotalcite particle 9 | 11.12 | 5.27 | 1.34 | 0.25 | 400 |
| Hydrotalcite particle 10 | 11.12 | 5.27 | 0.61 | 0.12 | 60 |
| Hydrotalcite particle 11 | 11.12 | 5.27 | 0.63 | 0.12 | 50 |
| Hydrotalcite particle 12 | 11.12 | 5.27 | 0.64 | 0.12 | 800 |

TABLE 1-continued

| Hydrotalcite particle | Mg atomic % | Al atomic % | F atomic % | F/Al ratio | Number average particle diameter H3 (nm) |
|---|---|---|---|---|---|
| Hydrotalcite particle 13 | 11.12 | 5.27 | 0.60 | 0.11 | 1000 |
| Hydrotalcite particle 14 | 11.12 | 5.27 | 0.00 | 0.00 | 400 |

Preparation of Hydrotalcite Particle 15

In the production example of the hydrotalcite particle 1, the obtained raw material hydrotalcite slurry was kept at 95° C., and 5 parts by mass of fluorosilicone oil was added to 95 parts by mass of solid content for surface treatment. Then, the hydrotalcite slurry was filtered through a membrane filter with a pore size of 0.5 μm and washed with the ion-exchanged water. The obtained hydrotalcite was vacuum dried overnight at 40° C. and then pulverized to obtain hydrotalcite particle 15. The obtained hydrotalcite particle 15 had a particle diameter of 400 nm and an F/Al of 0.02.

Preparation of Strontium Titanate Particle 1

After the metatitanic acid produced by the sulfuric acid method was deironized and bleached, a 3 mol/L sodium hydroxide aqueous solution was added thereto to be pH 9.0 to desulfurize, and then the mixture was neutralized to pH 5.6 with a 5 mol/L hydrochloric acid and was filtered and washed with water. Water was added to the washed cake to obtain a slurry of 1.90 mol/L as $TiO_2$, and then the hydrochloric acid was added to adjust the pH to 1.4 for deflocculation.

1.90 mol of $TiO_2$ was collected from the desulfurized and deflocculated metatitanic acid and put into a 3 L reacting container. After a strontium chloride aqueous solution was added to the deflocculated metatitanic acid slurry such that the $SrO/TiO_2$ (a molar ratio) become 1.15 and the SrO become 2.185 mol, the concentration of $TiO_2$ was adjusted to 1.039 mol/L. Next, after heating to 90° C. while stirring and mixing, 440 mL of a 10 mol/L sodium hydroxide aqueous solution was added over 40 minutes, then stirring was continued at 95° C. for 45 minutes, and then the mixture was put into ice water to be quenched, and thus the reaction was terminated.

The reaction slurry was heated to 70° C., 12 mol/L hydrochloric acid was added until the pH reached 5.0, stirring was continued for 1 hour, and the obtained precipitate was decanted.

The slurry containing the obtained precipitate was adjusted to 40° C., and the hydrochloric acid was added to adjust the pH to 2.5, and then 4.6% by mass of i-butyltrimethoxysilane and 4.6% by mass of trifluoropropyltrimethoxysilane relative to the solid content were added thereto and stirred for 10 hours. A 5 mol/L sodium hydroxide aqueous solution was added to adjust the pH to 6.5, and the mixture was stirred for 1 hour, filtered and washed, and the obtained cake was dried in the air at 120° C. for 8 hours and then pulverized to obtain strontium titanate particle 1. Table 2 shows the number average particle diameter of the primary particle of the obtained strontium titanate particle 1.

Preparation of Strontium Titanate Particle 2 to 5

Strontium titanate particle 2 to 5 were obtained in the same manner as in the production example of the strontium titanate particle 1 except that the mixing ratio of the titanium oxide source and the strontium source and the concentration of the titanium oxide source at the initial stage of the reaction were conveniently adjusted to change the number average particle diameter of the primary particle of the strontium titanate particle in the production example of the strontium titanate particle 1. Table 2 shows the number average particle diameter of the primary particle of the obtained strontium titanate particle 2 to 5.

Production Example of Strontium Titanate Particle 6

After 600 g of strontium carbonate and 350 g of titanium oxide were wet-mixed in a ball mill for 8 hours, the mixture was filtered and dried, and this mixture was molded at a pressure of 10 kg/cm$^2$ and sintered at 1200° C. for 7 hours. This sintered mixture was mechanically pulverized to obtain strontium titanate particle 6 subjected to a sintering process.

TABLE 2

| Strontium titanate particle | Number average particle diameter T3 (nm) |
|---|---|
| Strontium titanate particle 1 | 80 |
| Strontium titanate particle 2 | 250 |
| Strontium titanate particle 3 | 350 |
| Strontium titanate particle 4 | 30 |
| Strontium titanate particle 5 | 25 |
| Strontium titanate particle 6 | 700 |

Production examples of the toner will be described below.

Production Example of Toner 1

Preparation Example of Resin Particle Dispersion Liquid 1

Styrene: 70.0 parts
Butyl acrylate: 28.7 parts
Acrylic acid: 1.3 parts
n-lauryl mercaptan: 3.2 parts The above materials were put into a container and mixed by stirring. An aqueous solution of 150.0 parts of ion-exchanged water of 1.5 parts of Neogen RK (manufactured by Dai-ichi Kogyo Seiyaku Co., Ltd.) was added to the solution to be dispersed therein.

Further, an aqueous solution of 10.0 parts of ion-exchanged water of 0.3 parts of potassium persulfate was added while slowly stirring the mixture for 10 minutes. After nitrogen substitution, emulsion polymerization was carried out at 70° C. for 6 hours. After completion of the polymerization, the reaction solution was cooled to room temperature, and ion-exchanged water was added to obtain a resin particle dispersion liquid 1 having a solid content concentration of 12.5% by mass and a glass transition temperature of 48° C. When the particle size distribution of the resin particle contained in this resin particle dispersion liquid 1 was measured using a particle size measuring device (LA-920, manufactured by Horiba, Ltd.), the number average particle diameter of the contained resin particle was 0.2 μm. Moreover, coarse particle exceeding 1 μm were not observed.

Preparation Example of Resin Particle Dispersion Liquid 2

Styrene: 78.0 parts
Butyl acrylate: 20.7 parts
Acrylic acid: 1.3 parts
n-lauryl mercaptan: 3.2 parts A resin particle dispersion liquid 2 having a solid content concentration of 12.5% by mass and a glass transition temperature of 60° C. was obtained in the same manner as in the preparation example of the resin particle dispersion liquid 1 except that the materials were changed as described above in the preparation example of the resin particle dispersion liquid 1. When the particle size distribution of the resin particle contained in this resin particle dispersion liquid 2 was measured using a particle size measuring device (LA-920, manufactured by Horiba, Ltd.), the number average particle diameter of the contained resin particle was 0.2 μm. Moreover, coarse particle exceeding 1 μm were not observed.

Preparation Example of Release Agent Dispersion Liquid 1

100.0 parts of behenyl behenate (melting point: 72.1° C.) and 15.0 parts of Neogen RK was mixed with 385.0 parts of ion-exchanged water, and the mixture was dispersed using a wet jet mill JN100 (manufactured by Joko Co., Ltd.) for about 1 hour to obtain a release agent dispersion liquid 1. The wax concentration of the release agent dispersion liquid 1 was 20.0% by mass. When the particle size distribution of the release agent particle contained in this release agent dispersion liquid 1 was measured using a particle size measuring device (LA-920, manufactured by Horiba, Ltd.), the number average particle diameter of the contained resin agent particle was 0.35 μm. Moreover, coarse particle exceeding 1 μm were not observed.

Preparation Example of Release Agent Dispersion Liquid 2

100.0 parts of hydrocarbon wax HNP-9 (manufactured by Nippon Seiro Co., Ltd., melting point: 75.5° C.) and 15 parts of Neogen RK was mixed with 385.0 parts of ion-exchanged water, and the mixture was dispersed using a wet jet mill JN100 (manufactured by Joko Co., Ltd.) for about 1 hour to obtain a release agent dispersion liquid 2. The wax concentration of the release agent dispersion liquid 2 was 20.0% by mass. When the particle size distribution of the release agent particle contained in this release agent dispersion liquid 2 was measured using a particle size measuring device (LA-920, manufactured by Horiba, Ltd.), the number average particle diameter of the contained resin agent particle was 0.35 μm. Moreover, coarse particle exceeding 1 μm were not observed.

Preparation Example of Coloring Agent Dispersion Liquid 1

50.0 parts of copper phthalocyanine (Pigment Blue 15:3) as a coloring agent and 5.0 parts of Neogen RK were mixed with 200.0 parts of ion-exchanged water, and the mixture was dispersed using the wet jet mill JN100 for about 1 hour to obtain a coloring agent dispersion liquid 1. The solid content concentration of coloring agent dispersion liquid 1 was 20.0% by mass.

When the particle size distribution of the coloring agent particle contained in this coloring agent dispersion liquid 1 was measured using a particle size measuring device (LA-920, manufactured by Horiba, Ltd.), the number average particle diameter of the contained coloring agent particle was 0.20 μm. Moreover, coarse particle exceeding 1 μm were not observed.

Preparation of Toner Particle 1

Resin particle dispersion liquid 1:265.0 parts

Release agent dispersion liquid 1:10.0 parts

Release agent dispersion liquid 2:8.0 parts

Coloring agent dispersion liquid 1:8.0 parts

As a core forming step, the above materials were put into a round stainless steel flask and mixed with each other therein. Subsequently, the mixture was dispersed using a homogenizer (manufactured by IKA: Ultra Turrax T50) at 83.3 $s^{-1}$ for 10 minutes. The temperature in the container was adjusted to 30° C. while stirring, and a 1 mol/L sodium hydroxide aqueous solution was added to adjust the pH to 8.0.

As an aggregating agent, an aqueous solution obtained by dissolving 0.25 parts of aluminum chloride in 10.0 parts of ion-exchanged water was added to the above mixture over 10 minutes while being stirred at 30° C. After the mixture was left for 3 minutes, the temperature was raised to 60° C. to generate aggregation particle (core formation). The volume-based median diameter of the formed aggregation particle was conveniently verified using "Coulter Counter Multisizer 3" (a registered trademark, manufactured by Beckman Coulter, Inc.). When the volume-based median diameter reached 7.0 μm, 15.0 parts of the resin particle dispersion liquid 2 was put and stirred for 1 hour to form a shell as a shell forming step.

Thereafter, a 1 mol/L sodium hydroxide aqueous solution was added to the mixture to adjust the pH to 9.0, and the temperature was then raised to 95° C. to spheroidize the aggregation particle. When the average circularity reached 0.980, the temperature was lowered, and the mixture was cooled to room temperature to obtain a toner particle dispersion liquid 1.

Hydrochloric acid was added to the obtained toner particle dispersion liquid 1 to adjust the pH to 1.5 or less, and the mixture was left with stirred for 1 hour, and then solid-liquid separation was performed by a pressure filter to obtain a toner cake. This toner cake was reslurried with ion-exchanged water to form a dispersion liquid again and then subjected to solid-liquid separation with the above-described filter. After repeating the reslurry and the solid-liquid separation until the electric conductivity of the filtrate became 5.0 μS/cm or less, the solid-liquid separation was finally performed to obtain a toner cake. The obtained toner cake was dried and further classified using a classifier such that the volume-based median diameter was 7.0 μm, and thus a toner particle 1 was obtained.

Production Example of Toner 1

The hydrotalcite particle 1 (0.2 parts), the strontium titanate particle 1 (0.3 parts), and silica particle (RX200: primary average particle diameter 12 nm, HMDS treatment, manufactured by Nippon Aerosil Co., Ltd.) (1.3 parts) were externally mixed with the toner particle 1 (98.20 parts) obtained above using FM10C (manufactured by Nippon Coke Kogyo Co., Ltd.). As the external addition conditions, A0 blade was used as the lower blade, the distance from the deflector wall was set to 20 mm, and the external addition was performed in the state of the amount of toner particle charged: 2.0 kg, the rotation speed: 66.6 $s^{-1}$, the external addition time: 10 minutes, and cooling water at a temperature of 20° C. and a flow rate of 10 L/min.

Thereafter, a toner 1 was obtained by sieving with a mesh having an opening of 200 μm. Tables 3 and 4 show the physical properties of the toner 1 obtained.

Production Example of Toners 2 to 46

Toners 2 to 46 were obtained in the same manner as in the production example of the toner 1 except that the type and the addition amount of the hydrotalcite particle and the strontium titanate particle and the external addition conditions were changed as shown in Tables 3-1 and 3-2. Tables 3-1, 3-2 and 4 show the production conditions and the physical properties of the toners 2 to 46 obtained.

TABLE 3-1

| | Toner particle | | Silica fine particle | Particle H | | | |
|---|---|---|---|---|---|---|---|
| | Toner particle No. | Addition amount (parts by mass) | Addition amount (parts by mass) | Particle H No. | Addition amount (parts by mass) | Content (% by mass) | Number average particle diameter H3 (nm) |
| Toner 1 | Toner particle 1 | 98.20 | 1.3 | H-1 | 0.2 | 0.2 | 400 |
| Toner 2 | Toner particle 1 | 98.00 | 1.3 | H-1 | 0.2 | 0.2 | 400 |
| Toner 3 | Toner particle 1 | 98.35 | 1.3 | H-1 | 0.3 | 0.3 | 400 |
| Toner 4 | Toner particle 1 | 98.25 | 1.3 | H-1 | 0.05 | 0.05 | 400 |
| Toner 5 | Toner particle 1 | 98.15 | 1.3 | H-1 | 0.05 | 0.05 | 400 |
| Toner 6 | Toner particle 1 | 98.11 | 1.3 | H-2 | 0.09 | 0.09 | 400 |
| Toner 7 | Toner particle 1 | 98.13 | 1.3 | H-2 | 0.07 | 0.07 | 400 |
| Toner 8 | Toner particle 1 | 98.14 | 1.3 | H-2 | 0.06 | 0.06 | 400 |
| Toner 9 | Toner particle 1 | 98.10 | 1.3 | H-3 | 0.2 | 0.2 | 400 |
| Toner 10 | Toner particle 1 | 98.10 | 1.3 | H-4 | 0.2 | 0.2 | 400 |
| Toner 11 | Toner particle 1 | 98.20 | 1.3 | H-5 | 0.2 | 0.2 | 400 |
| Toner 12 | Toner particle 1 | 98.10 | 1.3 | H-5 | 0.2 | 0.2 | 400 |
| Toner 13 | Toner particle 1 | 98.10 | 1.3 | H-6 | 0.2 | 0.2 | 400 |
| Toner 14 | Toner particle 1 | 98.30 | 1.3 | H-7 | 0.2 | 0.2 | 400 |
| Toner 15 | Toner particle 1 | 98.20 | 1.3 | H-7 | 0.3 | 0.3 | 400 |
| Toner 16 | Toner particle 1 | 98.30 | 1.3 | H-8 | 0.2 | 0.2 | 400 |
| Toner 17 | Toner particle 1 | 98.35 | 1.3 | H-8 | 0.3 | 0.3 | 400 |
| Toner 18 | Toner particle 1 | 98.20 | 1.3 | H-9 | 0.2 | 0.2 | 400 |
| Toner 19 | Toner particle 1 | 98.55 | 1.3 | H-9 | 0.1 | 0.1 | 400 |
| Toner 20 | Toner particle 1 | 98.45 | 1.3 | H-9 | 0.2 | 0.2 | 400 |
| Toner 21 | Toner particle 1 | 98.45 | 1.3 | H-3 | 0.2 | 0.2 | 400 |
| Toner 22 | Toner particle 1 | 98.45 | 1.3 | H-4 | 0.2 | 0.2 | 400 |

TABLE 3-1-continued

| | Toner particle | | Silica fine particle | Particle H | | | |
|---|---|---|---|---|---|---|---|
| | Toner particle No. | Addition amount (parts by mass) | Addition amount (parts by mass) | Particle H No. | Addition amount (parts by mass) | Content (% by mass) | Number average particle diameter H3 (nm) |
| Toner 23 | Toner particle 1 | 98.45 | 1.3 | H-5 | 0.2 | 0.2 | 400 |
| Toner 24 | Toner particle 1 | 98.20 | 1.3 | H-10 | 0.2 | 0.2 | 60 |
| Toner 25 | Toner particle 1 | 98.20 | 1.3 | H-11 | 0.2 | 0.2 | 50 |
| Toner 26 | Toner particle 1 | 98.20 | 1.3 | H-1 | 0.2 | 0.2 | 400 |
| Toner 27 | Toner particle 1 | 98.20 | 1.3 | H-1 | 0.2 | 0.2 | 400 |
| Toner 28 | Toner particle 1 | 98.20 | 1.3 | H-1 | 0.2 | 0.2 | 400 |
| Toner 29 | Toner particle 1 | 98.20 | 1.3 | H-1 | 0.2 | 0.2 | 400 |
| Toner 30 | Toner particle 1 | 98.20 | 1.3 | H-1 | 0.2 | 0.2 | 400 |
| Toner 31 | Toner particle 1 | 98.20 | 1.3 | H-12 | 0.2 | 0.2 | 800 |
| Toner 32 | Toner particle 1 | 98.20 | 1.3 | H-12 | 0.2 | 0.2 | 800 |
| Toner 33 | Toner particle 1 | 98.20 | 1.3 | H-13 | 0.2 | 0.2 | 1000 |
| Toner 34 | Toner particle 1 | 98.20 | 1.3 | H-1 | 0.2 | 0.2 | 400 |
| Toner 35 | Toner particle 1 | 98.20 | 1.3 | H-1 | 0.2 | 0.2 | 400 |
| Toner 36 | Toner particle 1 | 98.50 | 1.3 | H-14 | 0.1 | 0.1 | 400 |
| Toner 37 | Toner particle 1 | 98.30 | 1.3 | H-15 | 0.3 | 0.3 | 400 |
| Toner 38 | Toner particle 1 | 98.38 | 1.3 | H-1 | 0.3 | 0.3 | 400 |
| Toner 39 | Toner particle 1 | 98.15 | 1.3 | H-1 | 0.5 | 0.5 | 400 |
| Toner 40 | Toner particle 1 | 97.65 | 1.3 | H-1 | 0.05 | 0.05 | 400 |
| Toner 41 | Toner particle 1 | 98.28 | 1.3 | H-1 | 0.02 | 0.02 | 400 |
| Toner 42 | Toner particle 1 | 97.10 | 1.3 | H-1 | 1.5 | 1.5 | 400 |
| Toner 43 | Toner particle 1 | 98.37 | 1.3 | H-4 | 0.3 | 0.3 | 400 |
| Toner 44 | Toner particle 1 | 98.05 | 1.3 | H-7 | 0.05 | 0.05 | 400 |
| Toner 45 | Toner particle 1 | 98.35 | 1.3 | H-10 | 0.3 | 0.3 | 60 |
| Toner 46 | Toner particle 1 | 98.25 | 1.3 | H-1 | 0.05 | 0.05 | 400 |

TABLE 3-2

| | Particle T | | | | External addition conditions | |
|---|---|---|---|---|---|---|
| | Particle T No. | Addition amount (parts by mass) | Content (% by mass) | Number average particle diameter T3 (nm) | Circumferential speed (m/s) | Time (min) |
| Toner 1 | T-1 | 0.3 | 0.3 | 80 | 35 | 7 |
| Toner 2 | T-1 | 0.5 | 0.5 | 80 | 35 | 7 |
| Toner 3 | T-1 | 0.05 | 0.05 | 80 | 35 | 7 |
| Toner 4 | T-1 | 0.4 | 0.4 | 80 | 35 | 7 |
| Toner 5 | T-1 | 0.5 | 0.5 | 80 | 35 | 7 |
| Toner 6 | T-1 | 0.5 | 0.5 | 80 | 35 | 7 |
| Toner 7 | T-1 | 0.5 | 0.5 | 80 | 35 | 7 |
| Toner 8 | T-1 | 0.5 | 0.5 | 80 | 35 | 7 |
| Toner 9 | T-1 | 0.4 | 0.4 | 80 | 35 | 7 |
| Toner 10 | T-1 | 0.4 | 0.4 | 80 | 35 | 7 |
| Toner 11 | T-1 | 0.3 | 0.3 | 80 | 35 | 7 |
| Toner 12 | T-1 | 0.4 | 0.4 | 80 | 35 | 7 |
| Toner 13 | T-1 | 0.4 | 0.4 | 80 | 35 | 7 |
| Toner 14 | T-1 | 0.2 | 0.2 | 80 | 35 | 7 |
| Toner 15 | T-1 | 0.2 | 0.2 | 80 | 35 | 7 |
| Toner 16 | T-1 | 0.2 | 0.2 | 80 | 35 | 7 |
| Toner 17 | T-1 | 0.05 | 0.05 | 80 | 35 | 7 |
| Toner 18 | T-1 | 0.3 | 0.3 | 80 | 35 | 7 |
| Toner 19 | T-1 | 0.05 | 0.05 | 80 | 35 | 7 |
| Toner 20 | T-1 | 0.05 | 0.05 | 80 | 35 | 7 |
| Toner 21 | T-1 | 0.05 | 0.05 | 80 | 35 | 7 |
| Toner 22 | T-1 | 0.05 | 0.05 | 80 | 35 | 7 |
| Toner 23 | T-1 | 0.05 | 0.05 | 80 | 35 | 7 |
| Toner 24 | T-1 | 0.3 | 0.3 | 80 | 35 | 7 |
| Toner 25 | T-1 | 0.3 | 0.3 | 80 | 35 | 7 |
| Toner 26 | T-2 | 0.3 | 0.3 | 250 | 35 | 7 |
| Toner 27 | T-3 | 0.3 | 0.3 | 350 | 35 | 7 |
| Toner 28 | T-6 | 0.3 | 0.3 | 700 | 35 | 7 |
| Toner 29 | T-4 | 0.3 | 0.3 | 30 | 35 | 7 |
| Toner 30 | T-5 | 0.3 | 0.3 | 25 | 35 | 7 |

TABLE 3-2-continued

| | Particle T | | | | External addition conditions | |
|---|---|---|---|---|---|---|
| | Particle T No. | Addition amount (parts by mass) | Content (% by mass) | Number average particle diameter T3 (nm) | Circumferential speed (m/s) | Time (min) |
| Toner 31 | T-2 | 0.3 | 0.3 | 250 | 35 | 7 |
| Toner 32 | T-1 | 0.3 | 0.3 | 80 | 35 | 7 |
| Toner 33 | T-1 | 0.3 | 0.3 | 80 | 35 | 7 |
| Toner 34 | T-1 | 0.3 | 0.3 | 80 | 35 | 5 |
| Toner 35 | T-1 | 0.3 | 0.3 | 80 | 25 | 5 |
| Toner 36 | T-1 | 0.1 | 0.1 | 80 | 35 | 7 |
| Toner 37 | T-1 | 0.1 | 0.1 | 80 | 35 | 7 |
| Toner 38 | T-1 | 0.02 | 0.02 | 80 | 35 | 7 |
| Toner 39 | T-1 | 0.05 | 0.05 | 80 | 35 | 7 |
| Toner 40 | T-1 | 1.00 | 1.00 | 80 | 35 | 7 |
| Toner 41 | T-1 | 0.4 | 0.4 | 80 | 35 | 7 |
| Toner 42 | T-1 | 0.1 | 0.1 | 80 | 35 | 7 |
| Toner 43 | T-1 | 0.03 | 0.03 | 80 | 35 | 7 |
| Toner 44 | T-1 | 0.6 | 0.6 | 80 | 35 | 7 |
| Toner 45 | T-1 | 0.05 | 0.05 | 80 | 35 | 7 |
| Toner 46 | T-3 | 0.4 | 0.4 | 350 | 35 | 7 |

In Tables 3-1 and 3-2, the particle H indicate the hydrotalcite particle, the particle T indicate the strontium titanate particle, H-1 to H-15 indicate the hydrotalcite particle 1 to 15, T-1 to T-6 indicate the strontium titanate particle 1 to 6, H3 indicates the number average particle diameter of the primary particle of the hydrotalcite particle, and T3 indicates the number average particle diameter of the primary particle of the strontium titanate particle.

TABLE 4-1

| | Physical properties related to H | | | | | |
|---|---|---|---|---|---|---|
| | F atomic % (atm %) | * | F/Al | H1 (%) | H2 | H3 (nm) |
| Toner 1 | 0.46 | Presence | 0.12 | 0.27 | 12.42 | 400 |
| Toner 2 | 0.46 | Presence | 0.12 | 0.27 | 12.42 | 400 |
| Toner 3 | 0.46 | Presence | 0.12 | 0.41 | 18.86 | 400 |
| Toner 4 | 0.46 | Presence | 0.12 | 0.07 | 3.22 | 400 |
| Toner 5 | 0.46 | Presence | 0.12 | 0.07 | 3.22 | 400 |
| Toner 6 | 0.19 | Presence | 0.05 | 0.12 | 2.28 | 400 |
| Toner 7 | 0.19 | Presence | 0.05 | 0.09 | 1.71 | 400 |
| Toner 8 | 0.19 | Presence | 0.05 | 0.08 | 1.52 | 400 |
| Toner 9 | 0.15 | Presence | 0.04 | 0.27 | 4.05 | 400 |
| Toner 10 | 0.08 | Presence | 0.02 | 0.27 | 2.16 | 400 |
| Toner 11 | 0.04 | Presence | 0.01 | 0.27 | 1.08 | 400 |
| Toner 12 | 0.04 | Presence | 0.01 | 0.27 | 1.08 | 400 |
| Toner 13 | 1.14 | Presence | 0.30 | 0.27 | 30.78 | 400 |
| Toner 14 | 2.28 | Presence | 0.60 | 0.27 | 61.56 | 400 |
| Toner 15 | 2.28 | Presence | 0.60 | 0.41 | 93.48 | 400 |
| Toner 16 | 2.47 | Presence | 0.65 | 0.27 | 66.69 | 400 |
| Toner 17 | 2.47 | Presence | 0.65 | 0.41 | 101.27 | 400 |
| Toner 18 | 0.95 | Presence | 0.25 | 0.27 | 25.65 | 400 |

TABLE 4-1-continued

| | Physical properties related to H | | | | | |
|---|---|---|---|---|---|---|
| | F atomic % (atm %) | * | F/Al | H1 (%) | H2 | H3 (nm) |
| Toner 19 | 0.95 | Presence | 0.25 | 0.14 | 13.30 | 400 |
| Toner 20 | 0.95 | Presence | 0.25 | 0.27 | 25.65 | 400 |
| Toner 21 | 0.15 | Presence | 0.04 | 0.27 | 4.05 | 400 |
| Toner 22 | 0.08 | Presence | 0.02 | 0.27 | 2.16 | 400 |
| Toner 23 | 0.04 | Presence | 0.01 | 0.27 | 1.08 | 400 |
| Toner 24 | 0.46 | Presence | 0.12 | 0.32 | 14.72 | 60 |
| Toner 25 | 0.46 | Presence | 0.12 | 0.33 | 15.18 | 50 |
| Toner 26 | 0.46 | Presence | 0.12 | 0.27 | 12.42 | 400 |
| Toner 27 | 0.46 | Presence | 0.12 | 0.27 | 12.42 | 400 |
| Toner 28 | 0.46 | Presence | 0.12 | 0.27 | 12.42 | 400 |
| Toner 29 | 0.46 | Presence | 0.12 | 0.27 | 12.42 | 400 |
| Toner 30 | 0.46 | Presence | 0.12 | 0.27 | 12.42 | 400 |
| Toner 31 | 0.46 | Presence | 0.12 | 0.24 | 11.04 | 800 |
| Toner 32 | 0.46 | Presence | 0.12 | 0.24 | 11.04 | 800 |
| Toner 33 | 0.42 | Presence | 0.11 | 0.22 | 9.24 | 1000 |
| Toner 34 | 0.46 | Presence | 0.12 | 0.27 | 12.42 | 400 |
| Toner 35 | 0.46 | Presence | 0.12 | 0.27 | 12.42 | 400 |
| Toner 36 | 0.00 | Absence | 0.00 | 0.14 | 0.00 | 400 |
| Toner 37 | 0.08 | Absence | 0.02 | 0.41 | 3.28 | 400 |
| Toner 38 | 0.46 | Presence | 0.12 | 0.41 | 18.86 | 400 |
| Toner 39 | 0.46 | Presence | 0.12 | 0.68 | 31.28 | 400 |
| Toner 40 | 0.46 | Presence | 0.12 | 0.07 | 3.22 | 400 |
| Toner 41 | 0.46 | Presence | 0.12 | 0.03 | 1.38 | 400 |
| Toner 42 | 0.46 | Presence | 0.12 | 2.03 | 93.38 | 400 |
| Toner 43 | 0.08 | Presence | 0.02 | 0.41 | 3.28 | 400 |
| Toner 44 | 2.28 | Presence | 0.60 | 0.07 | 15.96 | 400 |
| Toner 45 | 0.46 | Presence | 0.12 | 0.48 | 22.08 | 60 |
| Toner 46 | 0.46 | Presence | 0.12 | 0.07 | 3.22 | 400 |

TABLE 4-2

| | Physical properties related to T | | | | | | | |
|---|---|---|---|---|---|---|---|---|
| | Sr atomic % atm % | T1 (%) | T2 | T3 (nm) | T4 (nm) | T1/H1 | T2/H2 | H3/T3 | H3/T4 |
| Toner 1 | 2.9 | 0.36 | 104.40 | 80 | 160 | 1.33 | 8.41 | 5.00 | 2.50 |
| Toner 2 | 2.9 | 0.60 | 174.00 | 80 | 160 | 2.22 | 14.01 | 5.00 | 2.50 |
| Toner 3 | 2.9 | 0.06 | 17.40 | 80 | 160 | 0.15 | 0.92 | 5.00 | 2.50 |
| Toner 4 | 2.9 | 0.48 | 139.20 | 80 | 160 | 6.86 | 43.23 | 5.00 | 2.50 |
| Toner 5 | 2.9 | 0.60 | 174.00 | 80 | 160 | 8.57 | 54.04 | 5.00 | 2.50 |

TABLE 4-2-continued

| | Physical properties related to T | | | | | | | | |
|---|---|---|---|---|---|---|---|---|---|
| | Sr atomic % atm % | T1 (%) | T2 | T3 (nm) | T4 (nm) | T1/H1 | T2/H2 | H3/T3 | H3/T4 |
| Toner 6 | 2.9 | 0.60 | 174.00 | 80 | 160 | 5.00 | 76.32 | 5.00 | 2.50 |
| Toner 7 | 2.9 | 0.60 | 174.00 | 80 | 160 | 6.67 | 101.75 | 5.00 | 2.50 |
| Toner 8 | 2.9 | 0.60 | 174.00 | 80 | 160 | 7.50 | 114.47 | 5.00 | 2.50 |
| Toner 9 | 2.9 | 0.48 | 139.20 | 80 | 160 | 1.78 | 34.37 | 5.00 | 2.50 |
| Toner 10 | 2.9 | 0.48 | 139.20 | 80 | 160 | 1.78 | 64.44 | 5.00 | 2.50 |
| Toner 11 | 2.9 | 0.36 | 104.40 | 80 | 160 | 1.33 | 96.67 | 5.00 | 2.50 |
| Toner 12 | 2.9 | 0.48 | 139.20 | 80 | 160 | 1.78 | 128.89 | 5.00 | 2.50 |
| Toner 13 | 2.9 | 0.48 | 139.20 | 80 | 160 | 1.78 | 4.52 | 5.00 | 2.50 |
| Toner 14 | 2.9 | 0.24 | 69.60 | 80 | 160 | 0.89 | 1.13 | 5.00 | 2.50 |
| Toner 15 | 2.9 | 0.24 | 69.60 | 80 | 160 | 0.59 | 0.74 | 5.00 | 2.50 |
| Toner 16 | 2.9 | 0.24 | 69.60 | 80 | 160 | 0.89 | 1.04 | 5.00 | 2.50 |
| Toner 17 | 2.9 | 0.06 | 17.40 | 80 | 160 | 0.15 | 0.17 | 5.00 | 2.50 |
| Toner 18 | 2.9 | 0.36 | 104.40 | 80 | 160 | 1.33 | 4.07 | 5.00 | 2.50 |
| Toner 19 | 2.9 | 0.06 | 17.40 | 80 | 160 | 0.43 | 1.31 | 5.00 | 2.50 |
| Toner 20 | 2.9 | 0.06 | 17.40 | 80 | 160 | 0.22 | 0.68 | 5.00 | 2.50 |
| Toner 21 | 2.9 | 0.06 | 17.40 | 80 | 160 | 0.22 | 4.30 | 5.00 | 2.50 |
| Toner 22 | 2.9 | 0.06 | 17.40 | 80 | 160 | 0.22 | 8.06 | 5.00 | 2.50 |
| Toner 23 | 2.9 | 0.06 | 17.40 | 80 | 160 | 0.22 | 16.11 | 5.00 | 2.50 |
| Toner 24 | 2.9 | 0.36 | 104.40 | 80 | 160 | 1.13 | 7.09 | 0.75 | 0.38 |
| Toner 25 | 2.9 | 0.36 | 104.40 | 80 | 160 | 1.09 | 6.88 | 0.63 | 0.31 |
| Toner 26 | 2.9 | 0.31 | 89.90 | 250 | 350 | 1.15 | 7.24 | 1.60 | 1.14 |
| Toner 27 | 2.9 | 0.29 | 84.10 | 350 | 400 | 1.07 | 6.77 | 1.14 | 1.00 |
| Toner 28 | 2.9 | 0.29 | 84.10 | 700 | 1600 | 1.07 | 6.77 | 0.57 | 0.25 |
| Toner 29 | 2.9 | 0.40 | 116.00 | 30 | 70 | 1.48 | 9.34 | 13.33 | 5.71 |
| Toner 30 | 2.9 | 0.42 | 121.80 | 25 | 55 | 1.56 | 9.81 | 16.00 | 7.27 |
| Toner 31 | 2.9 | 0.36 | 104.40 | 250 | 350 | 1.50 | 9.46 | 3.20 | 2.29 |
| Toner 32 | 2.9 | 0.36 | 104.40 | 80 | 160 | 1.50 | 9.46 | 10.00 | 5.00 |
| Toner 33 | 2.9 | 0.36 | 104.40 | 80 | 160 | 1.64 | 11.30 | 12.50 | 6.25 |
| Toner 34 | 2.9 | 0.36 | 104.40 | 80 | 250 | 1.33 | 8.41 | 5.00 | 1.60 |
| Toner 35 | 2.9 | 0.36 | 104.40 | 80 | 380 | 1.33 | 8.41 | 5.00 | 1.05 |
| Toner 36 | 2.9 | 0.12 | 34.80 | 80 | 160 | 0.86 | — | 5.00 | 2.50 |
| Toner 37 | 2.9 | 0.12 | 34.80 | 80 | 160 | 0.29 | 10.61 | 5.00 | 2.50 |
| Toner 38 | 2.9 | 0.02 | 5.80 | 80 | 160 | 0.05 | 0.31 | 5.00 | 2.50 |
| Toner 39 | 2.9 | 0.06 | 17.40 | 80 | 160 | 0.09 | 0.56 | 5.00 | 2.50 |
| Toner 40 | 2.9 | 1.20 | 348.00 | 80 | 160 | 17.14 | 108.07 | 5.00 | 2.50 |
| Toner 41 | 2.9 | 0.48 | 139.20 | 80 | 160 | 16.00 | 100.87 | 5.00 | 2.50 |
| Toner 42 | 2.9 | 0.12 | 34.80 | 80 | 160 | 0.06 | 0.37 | 5.00 | 2.50 |
| Toner 43 | 2.9 | 0.04 | 11.60 | 80 | 160 | 0.10 | 3.54 | 5.00 | 2.50 |
| Toner 44 | 2.9 | 0.72 | 208.80 | 80 | 160 | 10.29 | 13.08 | 5.00 | 2.50 |
| Toner 45 | 2.9 | 0.06 | 17.40 | 80 | 160 | 0.13 | 0.79 | 0.75 | 0.38 |
| Toner 46 | 2.9 | 0.70 | 203.00 | 350 | 400 | 10.00 | 63.04 | 1.14 | 1.00 |

In Tables 4-1 and 4-2, * indicates determination whether or not fluorine atoms are contained inside the hydrotalcite particle, and "Presence" and "Absence" indicate that the fluorine atoms are contained inside the hydrotalcite particle and the fluorine atoms are not contained inside the hydrotalcite particle. Further, the physical properties related to H indicate the physical properties related to the hydrotalcite particle, H1 indicates the area ratio of the hydrotalcite particle to the toner particle, H2 indicates the product of F atomic %, H1, and 100, H3 indicates the number average particle diameter of the primary particle of the hydrotalcite particle, the physical properties related to T indicate the physical properties related to the strontium titanate particle, T1 indicates the area ratio of the strontium titanate particle to the toner particle, T2 indicates the product of Sr atomic %, T1, and 100, T3 indicates the number average particle size of the primary particle of the strontium titanate particle, and T4 indicates the aggregation diameter of the strontium titanate particle.

Image Evaluation

The image evaluation was performed using a commercially available color laser printer (HP LaserJet Enterprise Color M611dn, manufactured by HP) partially modified. Modification was made to work even if only one color process cartridge is installed. The toner was taken out from the cyan cartridge, and 325 g of the toner to be evaluated was filled instead, and evaluation was performed.

LL Replenishment Fog 1

For the purpose of testing the replenishment fog (the electrification stability), the following evaluation was carried out in a low temperature and low humidity environment (15° C./10% RH).

In a low temperature and low humidity environment, an image with a printing rate of 4.0% was output on a letter size plain paper (XEROX 4200, manufactured by XEROX, 75 g/m$^2$ or less, unless otherwise specified, this paper is used) by a total of 15,000 sheets at 3,000 sheets per day with an intermittent time of 2 seconds for every 2 sheets. A cartridge after the output was newly filled with 240 g of toner, and then the following fog evaluation was performed.

The fog was measured using a reflection densitometer (Reflectometer Model TC-6DS manufactured by Tokyo Denshoku Co., Ltd.). The fog on a drum is calculated by taping the drum with Mylar tape before the transfer of the solid white image and subtracting the Macbeth density of the Mylar tape pasted on the unused paper from the reflectance of the Mylar tape pasted on the paper.

Fog (reflectance) (%)=reflectance (%) on standard paper−reflectance (%) of sample non-image portion As the filter, three kinds of filters of green, amber, and blue were used for measurement, and the worst value was taken as a fog density.

The fog density evaluation was determined according to the following criteria. C or more was determined to be good.

Evaluation Criteria

A: Fog density less than 0.5%

B: Fog density 0.5% or more and less than 1.5%

C: Fog density 1.5% or more and less than 3.0%

D: Fog density 3.0% or more

LL Replenishment Fog 2

Evaluation was performed in the same manner as in the evaluation for the LL replenishment fog 1 except that the printing rate of the LL replenishment fog 1 was set to 1.5% and the durable number of sheets was set to 39,000, and determination was made according to the following criteria. C or more was determined to be good.

Evaluation Criteria

A: Fog density less than 0.5%

B: Fog density 0.5% or more and less than 1.5%

C: Fog density 1.5% or more and less than 3.0%

D: Fog density 3.0% or more

Solid Image Uniformity

In a low temperature and low humidity environment, an image with a printing rate of 4.0% was output on a letter size plain paper (XEROX 4200, manufactured by XEROX, 75 $g/m^2$ or less, unless otherwise specified, this paper is used) by a total of 15,000 sheets at 3,000 sheets per day with an intermittent time of 2 seconds for every 2 sheets. In the cartridge after the output of 15,000 sheets, three solid images were continuously output, the image density at the leading edge of the first solid image and the image density at the trailing edge of the third solid image were measured, a difference therebetween was calculated, and determination was made according to the following criteria. C or more was determined to be good.

Evaluation Criteria

A: The difference between the image density at the leading edge of the first solid image and the trailing edge of the third solid image is less than 0.10.

B: The difference between the image density at the leading edge of the first solid image and the trailing edge of the third solid image is 0.10 or more and less than 0.20.

C: The difference between the image density at the leading edge of the first solid image and the trailing edge of the third solid image is 0.20 or more and less than 0.30.

D: The difference between the image density at the leading edge of the first solid image and the trailing edge of the third solid image is 0.30 or more and less than 0.40.

Halftone Reproducibility

In a low temperature and low humidity environment, an image with a printing rate of 1.5% was output on a letter size plain paper (XEROX 4200, manufactured by XEROX, 75 $g/m^2$ or less, unless otherwise specified, this paper is used) by a total of 39,000 sheets at 3,000 sheets per day with an intermittent time of 2 seconds for every 2 sheets. After the output, one sheet of a halftone image was output.

The halftone image (the 49th gradation counted from the solid white image when a portion from the solid white to solid black was divided into 256 gradations) was visually observed, and the halftone reproducibility of the image was evaluated on the basis of the following criteria.

Evaluation Criteria

A: It is smooth with no feeling of coarseness at all.

B: Coarseness is not felt so much.

C: There is a slightly coarse feeling.

D: There is a clear coarse feeling.

Development Streak

Evaluation was made with the number of vertical streaks on a developing roller and on the halftone image for which the halftone reproducibility was evaluated.

Evaluation Criteria

A: Vertical streaks in a paper discharge direction are not seen on the developing roller or on the image.

B: Five or less thin streaks in a circumferential direction are observed on both ends of the developing roller. Alternatively, some slight vertical streaks in the paper discharge direction are seen on the image. However, it is a level that the streaks can be erased through image processing.

C: Thin streaks from 6 to 20 in a circumferential direction are observed on both ends of the developing roller. Alternatively, several thin streaks are seen on the image. However, it is a level that the streaks cannot be erased even through image processing.

D: 21 or more streaks are observed on the developing roller and on the image, and it is a level that the streaks cannot be erased even by image processing.

Examples 1 to 35

In Examples 1 to 35, toners 1 to 35 were used as the toner, and the above evaluation was performed. Table 5 shows the evaluation results.

Comparative Examples 1 to 11

In Comparative Examples 1 to 11, toners 36 to 46 were used as the toner, and the above evaluation was performed. Table 5 shows the evaluation results.

TABLE 5

| | | LL replenishment fog 1 | | LL replenishment fog 2 | | LL solid followability | | LL halftone reproducibility | Development streak |
|---|---|---|---|---|---|---|---|---|---|
| Example 1 | Toner 1 | A | 0.1 | A | 0.2 | A | 0.01 | A | A |
| Example 2 | Toner 2 | A | 0.2 | A | 0.3 | A | 0.02 | A | A |
| Example 3 | Toner 3 | C | 1.8 | C | 2.9 | A | 0.02 | A | A |
| Example 4 | Toner 4 | A | 0.2 | A | 0.4 | A | 0.03 | A | A |
| Example 5 | Toner 5 | B | 1.4 | C | 2.4 | A | 0.05 | A | A |
| Example 6 | Toner 6 | A | 0.2 | A | 0.4 | A | 0.06 | A | A |
| Example 7 | Toner 7 | A | 0.3 | B | 0.7 | A | 0.08 | A | A |
| Example 8 | Toner 8 | A | 0.4 | C | 1.5 | A | 0.09 | A | A |
| Example 9 | Toner 9 | A | 0.2 | A | 0.3 | A | 0.08 | A | A |
| Example 10 | Toner 10 | A | 0.2 | A | 0.4 | B | 0.13 | A | A |
| Example 11 | Toner 11 | A | 0.4 | B | 1.2 | C | 0.22 | A | A |

TABLE 5-continued

| | | LL replenishment fog 1 | | LL replenishment fog 2 | | LL solid followability | | LL halftone reproducibility | Development streak |
|---|---|---|---|---|---|---|---|---|---|
| Example 12 | Toner 12 | A | 0.4 | C | 2.0 | C | 0.25 | A | A |
| Example 13 | Toner 13 | A | 0.2 | A | 0.4 | A | 0.09 | A | A |
| Example 14 | Toner 14 | A | 0.4 | B | 1.0 | B | 0.14 | A | A |
| Example 15 | Toner 15 | A | 0.4 | C | 1.6 | B | 0.14 | A | A |
| Example 16 | Toner 16 | A | 0.4 | B | 1.3 | C | 0.25 | A | A |
| Example 17 | Toner 17 | A | 0.4 | C | 1.9 | C | 0.27 | A | A |
| Example 18 | Toner 18 | A | 0.2 | A | 0.4 | A | 0.07 | A | A |
| Example 19 | Toner 19 | A | 0.3 | B | 0.7 | A | 0.08 | A | A |
| Example 20 | Toner 20 | A | 0.4 | C | 1.6 | A | 0.09 | A | A |
| Example 21 | Toner 21 | A | 0.3 | B | 1.0 | A | 0.08 | A | A |
| Example 22 | Toner 22 | A | 0.2 | A | 0.4 | B | 0.11 | A | A |
| Example 23 | Toner 23 | A | 0.3 | A | 0.4 | C | 0.20 | A | A |
| Example 24 | Toner 24 | A | 0.4 | C | 1.8 | A | 0.07 | B | B |
| Example 25 | Toner 25 | A | 0.4 | C | 2.1 | A | 0.08 | C | C |
| Example 26 | Toner 26 | A | 0.4 | B | 0.9 | A | 0.06 | A | C |
| Example 27 | Toner 27 | A | 0.4 | C | 1.6 | A | 0.07 | A | C |
| Example 28 | Toner 28 | A | 0.4 | C | 2.9 | A | 0.09 | A | C |
| Example 29 | Toner 29 | A | 0.4 | B | 1.0 | A | 0.06 | A | B |
| Example 30 | Toner 30 | A | 0.4 | C | 1.7 | A | 0.07 | A | C |
| Example 31 | Toner 31 | A | 0.2 | A | 0.4 | A | 0.07 | B | C |
| Example 32 | Toner 32 | A | 0.4 | B | 1.2 | A | 0.08 | B | A |
| Example 33 | Toner 33 | A | 0.4 | C | 1.9 | A | 0.09 | C | B |
| Example 34 | Toner 34 | A | 0.2 | A | 0.3 | A | 0.05 | A | B |
| Example 35 | Toner 35 | A | 0.3 | A | 0.4 | A | 0.06 | A | C |
| Comparative Example 1 | Toner 36 | D | 3.1 | D | 4.5 | D | 0.32 | B | C |
| Comparative Example 2 | Toner 37 | C | 2.8 | D | 4.0 | C | 0.25 | B | C |
| Comparative Example 3 | Toner 38 | D | 3.5 | D | 5.0 | B | 0.15 | B | C |
| Comparative Example 4 | Toner 39 | D | 3.4 | D | 4.8 | B | 0.17 | B | C |
| Comparative Example 5 | Toner 40 | D | 3.6 | D | 5.1 | B | 0.16 | B | C |
| Comparative Example 6 | Toner 41 | D | 3.5 | D | 5.0 | B | 0.18 | B | C |
| Comparative Example 7 | Toner 42 | D | 3.7 | D | 5.2 | B | 0.18 | B | C |
| Comparative Example 8 | Toner 43 | D | 3.4 | D | 4.6 | C | 0.25 | B | C |
| Comparative Example 9 | Toner 44 | D | 3.4 | D | 4.5 | C | 0.26 | B | C |
| Comparative Example 10 | Toner 45 | D | 3.3 | D | 4.7 | B | 0.14 | B | D |
| Comparative Example 11 | Toner 46 | D | 3.5 | D | 4.8 | B | 0.15 | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029175, filed Feb. 28, 2022 which is hereby incorporated by reference herein in its entirety.

What is claimed is:

1. A toner, comprising:

a toner particle comprising a binder resin;

a strontium titanate particle on a surface of the toner particle; and a hydrotalcite particle on a surface of the toner particle, the hydrotalcite particle comprising fluorine, the fluorine being present inside the hydrotalcite particle in line analysis of STEM-EDS mapping analysis of the toner, wherein (T1/H1) is 0.15 to 9.00 and (T2/H2) is 0.50 to 145.00 when T1(%) is an area ratio of the strontium titanate particle to the toner particle in an EDS measurement field measured through the STEM-EDS mapping analysis, H1(%) is an area ratio of the hydrotalcite particle to the toner particle in the EDS measurement field, H2=((an atomic concentration of the fluorine in the hydrotalcite particle obtained from main component mapping of the hydrotalcite particle through the STEM-EDS mapping analysis of the toner)×H1×100) and T2=((an atomic concentration of strontium in the strontium titanate particle, obtained from main component mapping of the strontium titanate particle through the STEM-EDS mapping analysis of the toner)×T1×100).

2. The toner according to claim 1, wherein the hydrotalcite particle comprises aluminum.

3. The toner according to claim 2, wherein a ratio of an atomic concentration of fluorine to aluminum comprising the hydrotalcite particle obtained from main component mapping of the hydrotalcite particle through the STEM-EDS mapping analysis of the toner is 0.01 to 0.70.

4. The toner according to claim 1, wherein a number average particle diameter T3 (nm) of primary particle of the strontium titanate particle is 20 to 750 nm.

5. The toner according to claim 1, wherein a number average particle diameter H3 (nm) of primary particle of the hydrotalcite particle is 40 to 1100 nm.

6. The toner according to claim 1, wherein H3/T3 is 0.40 to 18.00 when T3 (nm) is a number average particle diameter of primary particle of the strontium titanate particle, and H3 (nm) is a number average particle diameter of primary particle of the hydrotalcite particle.

7. The toner according to claim 1, wherein H3/T4 is 0.20 to 8.00 when H3 (nm) is a number average particle diameter of primary particle of the hydrotalcite particle and T4 (nm) is a modal diameter in a weight-based particle size distribution of the strontium titanate particle adhering to the surface of the toner particle.

8. The toner according to claim 1, wherein T2/H2 is 4.00 to 76.00.

* * * * *